United States Patent

[11] 3,585,306

[72] Inventors Frank E. Battocletti
Columbus;
Clarence H. Dagnall, Jr., Westerville, Ohio;
Stephan A. Sheldahl, Littleton, Colo.

[21] Appl. No. 729,801
[22] Filed May 16, 1968
[45] Patented June 15, 1971
[73] Assignee Bell Telephone Laboratories, Incorporated
Murray Hill, N.J.

[54] TANDEM OFFICE TIME DIVISION SWITCHING SYSTEM
13 Claims, 21 Drawing Figs.

[52] U.S. Cl. .......... 179/15
[51] Int. Cl. .......... H04j 3/00
[50] Field of Search .......... 179/15 AP, DC, AT, A, 18; 340/172.5; 332/21, 11

[56] References Cited

UNITED STATES PATENTS

| | | | |
|---|---|---|---|
| 2,957,949 | 10/1960 | James et al. | 179/18 |
| 3,379,836 | 4/1968 | Brightman et al. | 178/50 |
| 3,403,383 | 9/1968 | Kienzie et al. | 340/172.5 |
| 3,446,917 | 5/1969 | Inose et al. | 179/15 |
| 3,458,659 | 6/1969 | Sterning | 179/15 (ATI) |
| 3,461,245 | 8/1969 | Johannes | 15(SYNC)/179 |

OTHER REFERENCES

Bell Laboratories Record, February 1949, pp.62— 66, J. M. Manley " Synchronization for the PCM Receiver" (N.B. P.63) Copy available in Scientific library of Patent Office.

Bell Laboratories Record, January 1949, pp.10— 15, A. E. Johanson " Timing Control for PCM" (N.B. P.11) Copy available in Scientific Library of Patent Office.

*Primary Examiner*—Kathleen H. Claffy
*Assistant Examiner*—David L. Stewart
*Attorneys*—R. J. Guenther and James Warren Falk

ABSTRACT: A tandem office switching system is disclosed which will accommodate both digital and analog signals transmitted in single or multiplexed message form. A space division system switches analog signals received in serial single message form and a time division system switches digital signals received in multiplex message form. All signals received in the time division system are processed in accordance with timing derived from the incoming digital signals while signals transmitted from the time division system are processed in accordance with the tandem office timing. The system permits the switching of incoming analog signals to outgoing digital trunks and incoming digital signals to outgoing analog trunks through both space and time division systems.

Figure 1:
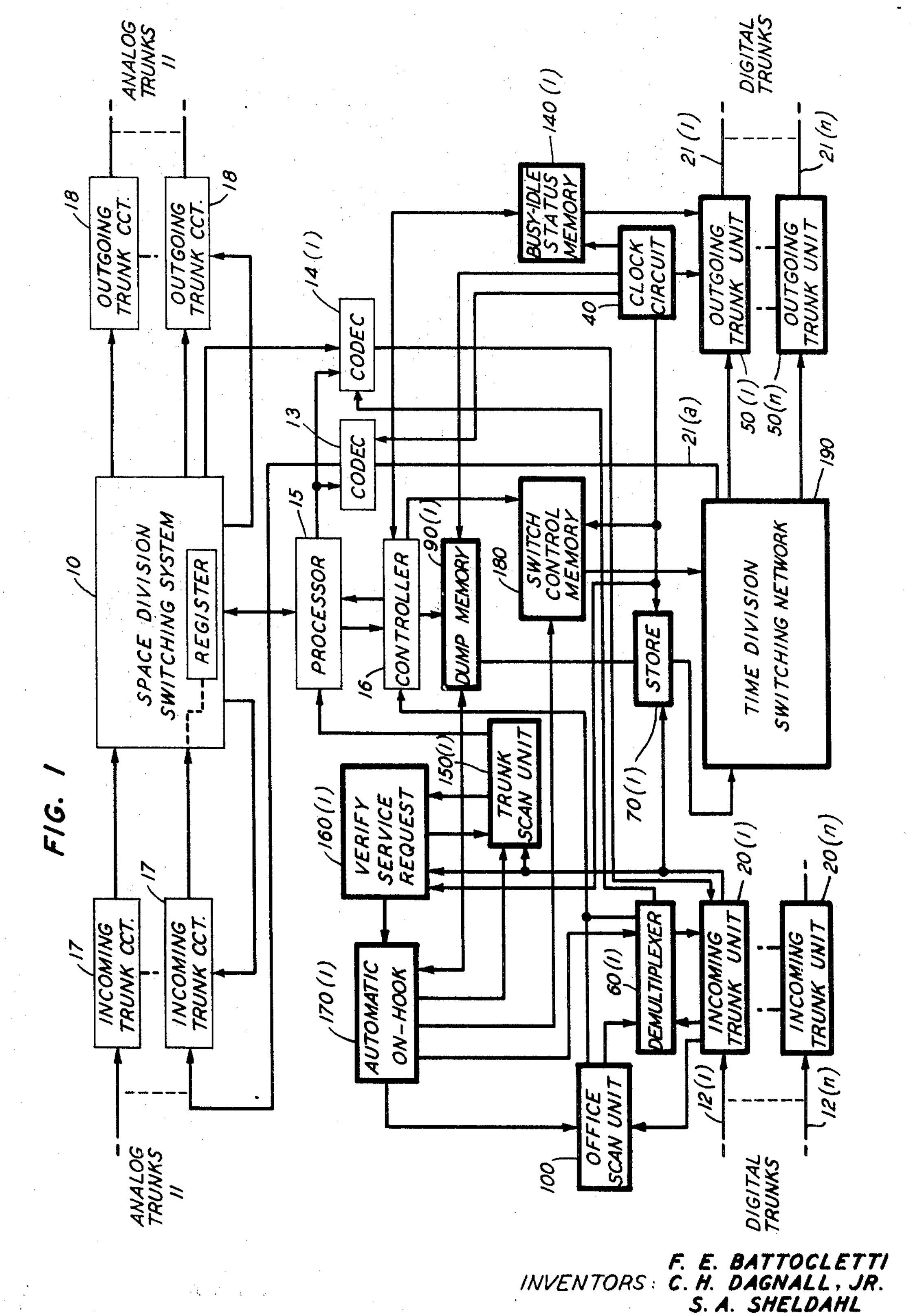

INVENTORS: F. E. BATTOCLETTI
C. H. DAGNALL, JR.
S. A. SHELDAHL
BY R.C. Winter
ATTORNEY

CHANNEL UNIT COMMON EQUIPMENT

TANDEM OFFICE TIME DIVISION SWITCHING SYSTEM

BACKGROUND OF THE INVENTION

In densely settled communities, where the number of local central offices is large and the amount of interoffice traffic is high, it is often uneconomical to provide trunks between each pair of offices. In such cases tandem switching centers are used to interconnect the local offices, calls between offices being completed through the tandem center rather than through interoffice trunks directly linking the offices. Thus the function of a tandem center with respect to the local central office which it serves corresponds to some extent to the operation of a local central office in interconnecting subscriber lines which terminate in the office; i.e., the tandem center establishes paths between central offices and the central office establishes paths between local subscribers.

The current practice in telephone systems is to establish a solid connection between a calling and a called line via a path which is associated individually and uninterruptively with the connection for the duration of the call. Thus a quantity of equipment, dependent upon the number of lines served and the expected frequency of service, is provided in a common pool from which portions may be chosen and assigned for a particular call. Such a system arrangement is referred to as "space division" in which privacy of conversation is assured by the separation of individual conversations in space.

Tandem switching on a space division basis presents unique problems when transmission of information in multiplexed digital form is contemplated. This, of course, is the current trend as evidenced, for example, by the use of pulse code modulation (PCM) for short haul traffic and for the burgeoning data processing business with its incident transfer between computer centers of data in coded form. In order to handle traffic in digital form, the conventional tandem center is required to convert the incoming data to analog form for processing by the space division switching network. Then, of course, the data may require reconversion to digital form for transmission to a distant local office. Such conversion and reconversion is a costly process and also adds undesirable quantizing noise to the signal being transmitted.

The introduction of a time division switching network into the tandem center, to process information through the center in digital form, would substantially reduce the economic burden on the system and improve transmission. Such an arrangement would, of course, require conversion at an interface between the space and time division networks so that data received in analog form could be switched to an outgoing digital trunk and vice versa. In time division systems, a number of conversations share a single path. Privacy of conversations is assured in such systems by separation of samples of individual conversations in time. Thus each call is assigned to the common path or bus for an extremely short but rapidly and periodically recurring interval, and the connection between any two lines in communication is completed only during these short intervals. Samples which retain essential characteristics of the voice or other signal are transmitted in these intervals or time channels. These samples then are utilized to reconstruct the original signal so that the reception of signals of any complexity through the time division network is satisfactory. For purposes of short haul traffic, such voice signals typically are coded in PCM form, and the binary digits forming a coded word are transmitted in each time channel.

Thus, at the tandem office, intelligence and supervisory information is received in time division multiplexed digital form. It is the task of the tandem office to detect and distinguish between these various signals and switch them, together with incoming analog signals, to appropriate outgoing trunks.

SUMMARY OF THE INVENTION

Two switching networks are utilized in a tandem office in an illustrative embodiment of our invention. A space division network, such as the well-known crossbar-type, switches signals received in analog form. Thus incoming analog trunks, each carrying a single message at a time, may be connected directly to outgoing analog trunks through the space division switching network in the well known manner. A time division network in turn switches messages received in multiplexed digital form between incoming and outgoing digital trunks in order to obviate an interim decoding to analog form.

Of course, the situation may arise in the tandem office when information received on an analog trunk must be switched to an outgoing digital trunk and vice versa. In accordance with the illustrative embodiment of our invention, this operation is implemented by the provision of appropriate analog-to-digital and digital-to-analog conversion circuitry, termed coder-decoders or codecs, at the interface between the space and time division switching systems.

Signals which are time multiplexed on an incoming digital trunk are separated and routed to the appropriate outgoing trunk by utilizing time slot interchange in the time division system. This interchange operation is described, for example, in H. Inose Pat. No. 3,172,956, issued Mar. 9, 1965. Time slot interchange and control of the time division switching network are performed, in accordance with one aspect of our invention, by utilizing a unique signal transfer operation in which the demultiplexing and storage of information are synchronized with the incoming multiplexed signal pulse train, while the switching of the pulse train to outgoing trunks is synchronized with timing developed by the tandem office itself. This complete separation of timing functions permits considerable flexibility in the control of the time division switching operations and is compatible with the interchange of time and space divided information in a tandem office.

In accordance with another aspect of our invention, digital channels in the codecs, transmitting converted analog information from analog trunks terminating on the space division system, are connected to storage facilities designated channel storage units in the time division system in place of individual channels of incoming digital trunks normally connected to particular channel units. However, the timing information for controlling the transfer of information from the codecs to the channel storage units is still derived from the channels multiplexed on the incoming digital trunk. In the extreme case a codec could usurp substantially all of the channels of an incoming digital trunk; that trunk, however, would still serve the important function of providing the timing for the codec-to-store connection.

DRAWINGS

Figure 20:
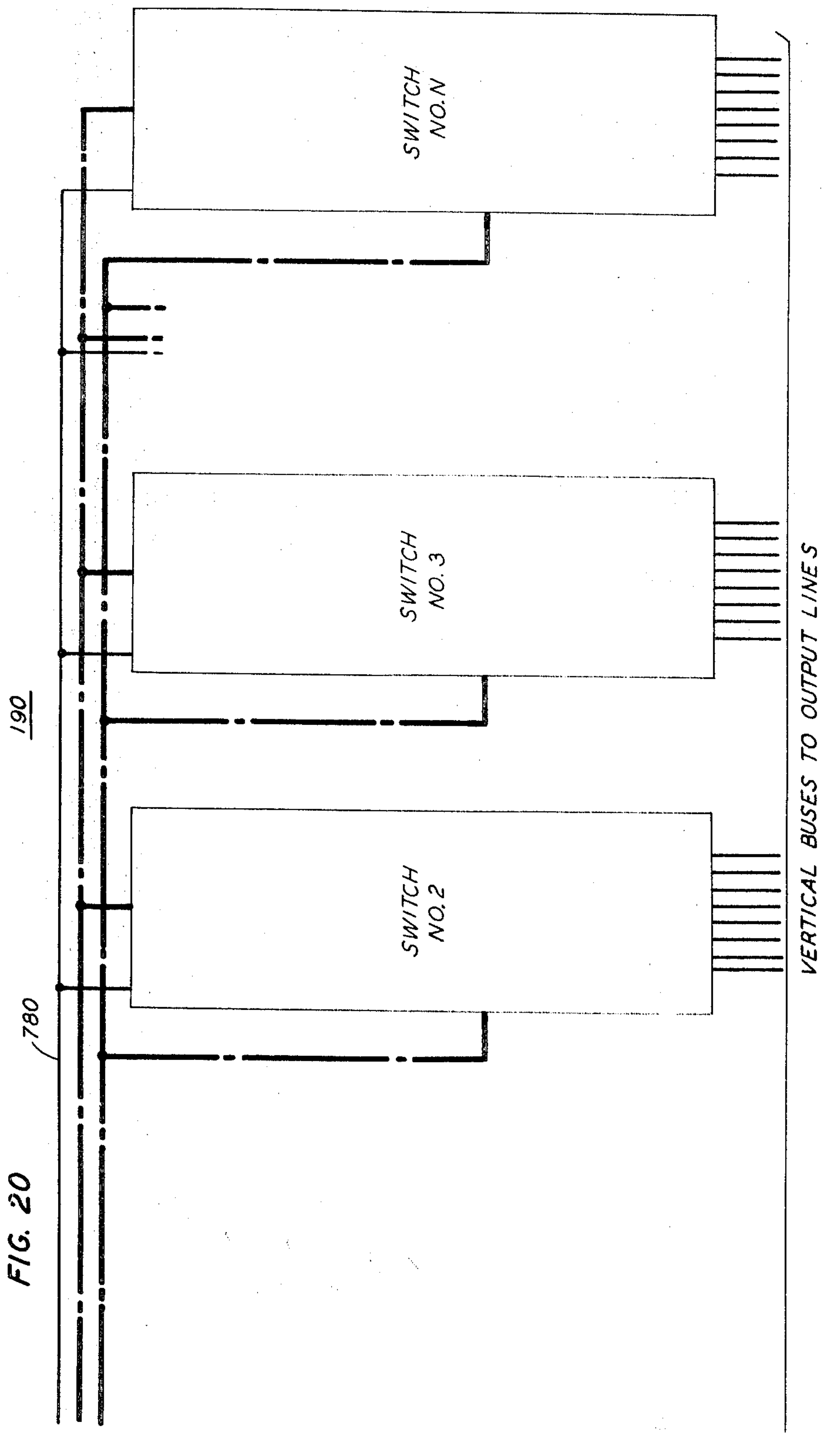
Figure 21:
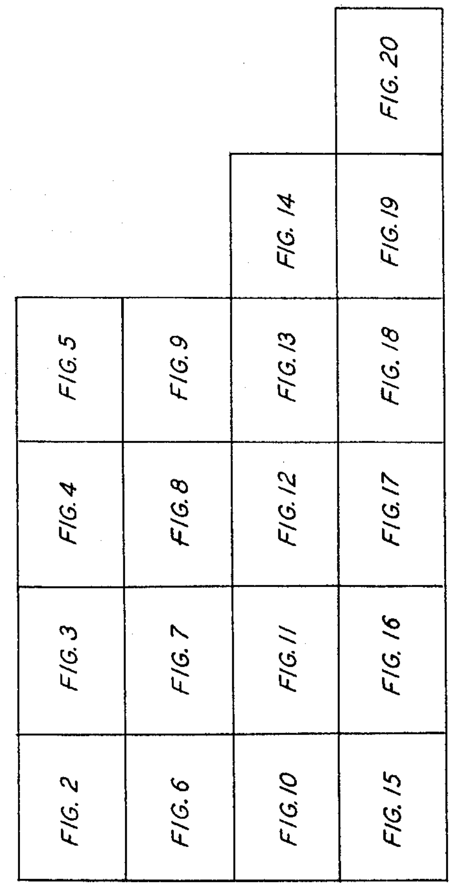

FIG. 1 is a block diagram representation of a telephone tandem office including time and space division switching systems and illustrative of one specific embodiment of our invention; and FIGS. 2—20, when arranged as indicated in FIG. 21, provide a detailed representation in schematic form of the time division switching system of the telephone tandem office in FIG. 1.

GENERAL DESCRIPTION (FIG. 1)

Turning now to the drawing, the telephone tandem office depicted in FIG. 1 includes a space division switching system 10 of the type well known in the art and disclosed for example in R. N. Breed et al. Pat. No. 2,848,543, issued Oct. 17, 1954. The internal operation and its control are not essential to an understanding of this invention which is concerned rather with the operation and control of the time division switching network 190 and the interchange of information between the different types of trunks terminating on the tandem office. Thus switching system 10 includes the necessary marker, sender and other circuits as known in the art. Space division system 10 terminates analog trunks 11 which normally carry analog signals such as speech.

Digital trunks 12(1)—12 (*n*) and 21 (1)—21 (*n*) carry information coded in digital form, which information is obtained from a number of sources and combined through time division multiplexing for transmission in a serial pulse train. The conventional practice in tandem offices is to switch the information through the space division system in analog form. This, of course, requires that digital information, received on the digital trunks, must be converted to analog form prior to switching.

The arrangement in accordance with this embodiment of the invention permits signals to be switched through the tandem office in digital or analog form. The saving in conversion equipment through this approach may be substantial, and moreover the quantizing noise developed upon each such conversion is eliminated. For this purpose the analog trunks 11 terminate on space division system 10 in accordance with conventional tandem office practice while the digital trunks terminate on a time division switching system.

For switching information on digital trunks, the particular time channel containing the incoming information is connected to a time channel in the proper outgoing digital trunk through store 70(1) and time division network 190, in which event a digital-to-analog conversion is not required. In this respect, time division network 190 and its control circuitry operates independently of space division system 10. If it is desired to transfer digital information incoming on a digital trunk to an outgoing analog trunk, the tandem office is arranged to switch the information in digital form through time division network 190, convert the information into its analog counterpart in a circuit designated a codec, such as codec 13, and again switch the information now in analog form through space division system 10 to the appropriate outgoing analog trunk 11. Similarly, information received in analog form via an incoming analog trunk 11 may be transferred to one of the outgoing trunks **21(1)—21 (*n*). For this purpose, the information is first switched through space division system 10, converted to coded form in a codec, such as codec 14(1), and applied to an incoming trunk unit, such as unit 20(1), where it is treated the same as information received in a channel of the corresponding incoming digital trunk 12(1)**.

It may be considered that the information received via a digital trunk is a composite of a plurality of individual conversations coded in digital form and time division multiplexed to form a serial pulse train. Thus each time channel in a repetitive sequence of time channels, designated a frame interval, contains one coded sample of the particular information assigned to that channel. The primary responsibility of the tandem office is to separate the information contained in a single channel from the other channels in each frame interval and to switch the information so obtained to a predetermined channel in an outgoing digital trunk. In order to effect this transfer, the tandem office must be able to recognize the arrival of information in the particular channel. For this purpose two digit positions in each frame interval are utilized to synchronize the timing of the incoming information with the timing of the control circuitry in the tandem office. In addition one of the channel digit positions contains signaling information and the balance of the positions contain the intelligence in coded form. Finally, since signaling information is not required in every frame, the tandem office need only recognize the presence of a signaling frame and then proceed to examine the signaling digit position in each channel of that frame.

In order to perform the time division switching operation, the tandem office must be provided with the facility for interchanging time channels, otherwise its function as a tandem office cannot be served effectively. As indicated hereinbefore, this function is disclosed, for example, in H. Inose et al. Pat. No. 3,172,956. In brief, a first one of the incoming digital trunks, 12(1), may contain a signal sample in a particular time channel, such as time channel 10, which signal sample must be directed through outgoing digital trunk **21(*n*) in order to reach the desired destination. However, time channel 10 on trunk 21(*n*) may already be occupied. Therefore, in order to avoid the blockage encountered at this point, an idle time channel, such as channel 20, in trunk 21(*n*) is assigned to this connection. Thus all signal samples received thereafter in time channel 10 of the incoming path of digital trunk 12(1) will be transferred through store 70(1) and time division network 190 to time channel 20 in outgoing trunk 21(*n*)**.

The manner of effecting synchronization and time channel interchange are the primary concern of one aspect of our invention as considered in the detailed description to follow. Basically the operation comprises demultiplexing the channels of a pulse train arriving on a digital trunk, storing the demultiplexed information and retrieving the information from storage at the proper time for direct insertion into the assigned channels of an outgoing serial pulse train. Demultiplexing and storage of the incoming information is under control of synchronization signals accompanying the information in the incoming serial pulse train, while retrieval of the information from storage and its subsequent placement in an outgoing serial pulse train is under control of the tandem office clock 40.

The operations necessary for transferring information through the tandem office are performed by the circuits shown in block form in FIG. 1. It may be noted that certain control units are designated (1) to indicate their association only with incoming trunk 12(1). Other incoming digital trunks require a similar set of control units. Each of the other control units serve all of the incoming digital trunks **12(1)—12(*n*). Thus incoming trunk unit 20(1) contains a frame detector which detects each incoming frame interval and a signaling frame detector which detects the particular signaling frame of the pulse train on incoming digital trunk 12(1). The frame detector assures that demultiplexer 60(1) is in synchronism with the incoming serial pulse train and initiates a reframing procedure if this is not the case. The signaling frame detector determines the particular frame in which a digit in each channel contains signaling information and enables signal receiving equipment in store 70(1) during such signaling frames. Demultiplexer 60(1) generates digit and word pulses which gate the incoming information into respective channel storage units in store 70(1)**.

During signaling frames, trunk scan unit 150(1) compares the channel status, as defined by the signaling digit in a channel, with the status of that particular channel in the tandem office. A request for service detected in a particular channel brings verify service request circuit 160(1) into operation. This circuit observes the signaling digit in the given channel on three consecutive appearances, whereupon it enables automatic on-hook circuit 170(1). If an error had generated the service request, verify service request circuit 160(1) would reset all associated equipment and allow the scan of all channels to continue. If the service request is verified and it is determined that a call is being originated in a particular channel, office scan unit 100 will transmit to processor 15, via demultiplexer 60(1), the trunk and channel addresses for the given service request. If, on the other hand, the verified service request indicates that a particular call connection should be discontinued and the channel restored to an idle condition, automatic on-hook circuit 170(1) will act to clear memory 90(1) and so drop the connection and restore the normal condition in the office preparatory to receipt of another request in this channel.

Signaling information is inserted in busy channels at the output of store 70(1). Retrieval of information from store 70(1) is under control of dump memory 90(1) which in turn is controlled by processor 15 through controller 16. Thus, when tandem office clock 40 indicates that an outgoing channel should be filled, the appropriate channel unit in store 70(1) will be enabled by the output of dump memory 90(1). Concurrently a path through time division network 190 is established under control of switch control memory 180 so as to direct the stored word to the appropriate outgoing digital trunk in the proper time interval.

Processor 15 receives information from the various control components and, in conjunction with a stored program, determines the actions to be taken in the time division system. Appropriate commands to implement these actions are routed through controller 16 to the various memory components. Stored program control arrangements suitable for this purpose are well known in the art as evidenced, for example, by F. S. Vigliante et al. Pat. No. 3,268,669, issued Aug. 27, 1966. In this instance processor 15 and controller 16, correspond respectively to the call processing section and the input-output section described in the patent.

On the output side of the network, outgoing trunk unit 50(*n*) performs the necessary functions in assembling the serial pulse train on the outgoing path of trunk 21(*n*) under control of tandem office clock 40, and busy-idle status memory 140(1). Trunk unit 50(*n*) must be operated in concert with store 70(1) to assure that the intelligence and signaling digits are in proper positions in the outgoing pulse train and that the frame pulse pattern is transmitted in the proper order to permit identification by the succeeding office of the particular signaling frame.

Apart from the time division aspects of the tandem office operation, it is also necessary that the local control establish paths through the space division system 10 in those instances in which a connection is required between analog and digital trunks. Thus, the destination information received in conjunction with a service request may be utilized to direct processor 15 to establish the appropriate connection through both time and space division systems. As indicated heretofore, the conversion between digital and analog signals is performed by the codecs 13 and 14(1) which are also reached by connections under control of processor 15. Codecs 13 and 14(1) represent a combination coder, or analog-to-digital converter, and decoder, or digital-to-analog converter, plus all of the associated circuitry such as serial-to-parallel converters, code translators, and framing and timing circuits, all of which are familiar to the art. A detailed description of codecs suitable for this purpose is included in an article by J. O. Edson and H. H. Henning entitled "Broadband Codecs for an Experimental 224 Mb/s PCM Terminal," BSTJ 44 Nov. 1965, pp. 1887—1940.

INFORMATION ARRANGEMENT

In this illustrative embodiment a specific format is chosen for the pulse train on the digital trunks, and a knowledge of this format will aid in understanding the detailed operation of the various tandem office components. Thus the pulse train is divided into repetitive, 24 channel frames of 194 binary digit pulses or bits. A frame, in turn, consists of 24 channels, each containing an 8-bit word. Thus each channel is capable of transmitting a distinct conversation. The remaining two bits in each frame are used to synchronize the tandem office with the incoming pulse train.

Every sixth frame is utilized for signaling, and in this frame, the eighth bit in each channel will contain signaling information. Thus if the eighth bit in a particular channel is a binary "one," the channel is identified as being idle, while if a binary "zero" is present the channel is busy. The frame bits also identify the signaling frame. Thus looking only at the sequence of frame bits, with the intelligence bits removed from the pulse train, a repetitive pattern of 01, 1X, 01, 1X will appear in four successive frames. The X bit varies between 1 and 0 according to its own repetitive sequence, viz., 0, 0, 0, 1 1 1 0, 0, 0, 1, 1, 1, in 12 consecutive frames. With this arrangement is may be noted that the pattern of frame bits changes in each sixth frame,

FRAME 1 2 3 4 5 6 1 2 3 4 5 6

PATTERN 01 10 01 10 01 11 01 11 01 11 01 10.

Circuitry in the tandem office, as described hereinafter, detects this change in sequence, denoting each sixth frame, and arranges for the storage of the signaling bits contained therein.

LOGIC CIRCUITRY

The specific illustrative embodiment of the invention as depicted in FIGS. 2—20 utilizes components suitable for the processing of binary signals. These components, referred to generically as logic circuitry, include the AND gate which provides an output signal of one binary type only upon the coincident receipt of that type of signal at all inputs, the NAND gate which provides an output signal of one binary-type only if that type of binary signal is not received at all of its inputs, the OR gate which provides an output if a particular binary signal is present on at least one of its inputs, the EXCLUSIVE OR circuit which provides an output of one binary type so long as the inputs are not all of that type, and the INVERTER which is a single input NAND gate. In addition shift registers, counters, flip-flops and multivibrators, as known in the art, are employed herein.

Certain of the flip-flops are of the master-slave-type in which a clock pulse C is necessary in conjunction with the J and K inputs to affect the state of outputs Q and $\bar{Q}$. If the J and K inputs are present during the clock pulse, the output states change upon the termination of the clock pulse. Thus in the presence of the clock pulse, a "0" on both J and K will leave Q and $\bar{Q}$ in their current states. A "1" on both J and K will change Q and $\bar{Q}$ to the opposite of their current state. With a "0' on J and "1" on K, Q will be "0" and $\bar{Q}$ a "1". Similarly with a "1" on J and "0" on K, WQ will be "1" and $\bar{Q}$ a "0". The preset input S forces Q into the "1' state and the clear input R forces Q into the "0" state. The preset and clear inputs are independent of the clock input.

FRAME DETECTOR (FIG. 2)

Frame detector 201 in incoming trunk unit 20(1) is made up F NAND gates, a shift register and flip-flops. The purpose of the circuit is to compare the output of demultiplexer 60(1), FIG. 6, with the incoming framing information. It does this by looking at the incoming pulse stream during the time that it expects to see framing pulses and by checking to see whether it actually does receive framing pulses at that time.

The count in demultiplexer 60(1) starts at zero and proceeds to 191, thereby defining the requisite 24 -bit words. The following pulses, 192 and 193, are used for framing. NAND gate 202, FIG. 2, receives the framing pulses from the sections of counter 605, FIG. 6, that relate to the binary loading code of $2^6$ and $2^7$. The output of NAND gate 202 will, therefore, be provided only during clock pulses 192 and 193. This output is inverted at NAND gate 203, the output of which enables AND gate 206 to deliver regenerated clock pulses to shift register 210 only during these two pulse intervals. Thus during pulse intervals 192 and 193, shift register 210 receives information directly from the incoming path of the corresponding four-wire trunk 12(1) through converter 200 and NAND gate 207. It is assumed, therefore, that during intervals 192 and 193 the actual framing pulses, as provided by the transmitting office, are stored in shift register 210. If they are not, a match and check of the circuitry will reveal this situation.

As indicated heretofore, the framing pulses form a repetitive pattern which changes every sixth frame, viz.,

FRAME 1 2 3 4 5 6 7 9 10 11 12

PATTERN 01 10 01 10 01 11 01 11 01 11 01 10 Shift register 210 stores two consecutive frames of this pattern as, reading from stages A through D, 011X, (the in-frame pattern) and in the next frame, 1X01 (the out-of-frame pattern), X being the frame pulse which changes the pattern.

During the time that register 210 is loaded with the in-frame pattern 011X, NAND gate 211 will provide a "0" output which will appear on the K input of flip-flop 215. NAND gate 212 in turn, places a "1" on the J input of flip-flop 215. This combination during alternate frames results in a "1" on the Q output upon termination of a clock pulse at the C input. This "1" signal on lead 216 indicates the presence in register 210 of the in-frame condition. If the 011 output of the respective stages A, B and C in register 210 is not present, gate 211 will produce a "1" output. Flip-flop 215 when clocked will therefore produce a "1" output on lead 217, indicating the out-of-frame condition.

If flip-flop 215 is indicating the in-frame condition, the "0" signal on lead 217 and 218 will result in a "1" from NAND gate 219 at the K input of flip-flop 220 which is wired internally to provide a "1" permanently at the J input. Therefore, during digit D8 of each word W24 comprising the other inputs to NAND gate 219, flip-flop 220 will have its output state changed, the W24 pulse also providing the clock C input. In effect then, flip-flop 220 is programmed to allow word pulse W1 to pass through NAND gates 225 and 226 to clock flip-flop 215 only in every other frame when shift register 210 should be examined for the 011X, in-frame pattern.

If an out-of-frame pattern is detected, the output "1" of flip-flop 215 on leads 217 and 218 will be applied to the R, J and K inputs of flip-flop 230 and one input of gate 219. This produces a number of sequential operations. Upon the next occurrence of word pulse W24 and digit pulse D8, flip-flop 220 will provide a "1" output due to the "0" output of NAND gate 219. Therefore each subsequent occurrence of word pulse W1 will clock flip-flop 215 through NAND gates 225 and 226 so that the content of shift register 210 is checked in every frame rather than every other frame as before. The correct framing bits now are being sought.

In the case that frame detector 201 has shown by the output of flip-flop 215 that the out-of-frame condition is present, the possibility that a transmission error was the cause in first investigated. If this is not the case, the system is truly in the out-of-frame condition, and multiplex counter 605 must be restored to a counting sequence that is in-frame with the incoming path. This is accomplished by inhibiting counter 605 from counting one pulse, thereby slipping its count one pulse, and again checking for the in-frame condition. A two frame delay is required before taking this action to assure that a digit error is not responsible. Since the word pulses are generated in sequence, word pulse W3 occurs after word pulse W1, and word pulse W24 occurs after word pulse W3. When word pulse W1 clocks flip-flop 215 to indicate the presence of the out-of-frame condition, flip-flop 230 is released from the reset condition by the resultant "1" on lead 218 and must wait for word pulse W1 to occur in the next frame before it can change its output state to enable NAND gate 233. Thus in the next frame following the one in which an out-of-frame condition was detected, word pulse W1 changes the state of flip-flop 230, and the next word pulse W3 passes through gate 233. If a bit error had caused the out-of-frame condition, register 210 would now contain the 1X01 condition. If this is true, the output of NAND gate 235 will be a "0," which will inhibit word pulse W3 at NAND gate 236 after it has passed through NAND gates 233 and 234. In the next frame we should find the required 011X pattern in register 210 which will result in an in-frame indication. If, however, the inputs to gate 235 produce a "1" output, it is assumed that the out-of-frame condition is present, and, therefore an output " 0" from gate 236 will actuate monostable multivibrator 237 to inhibit counter 605 at gate 601 from counting one of the clock pulses. Gate 601 will be inhibited every second frame thereafter until the in-frame condition is realized.

The output of shift register 210 is not observed during appearance of the framing pulses immediately following the frame in which the clock is slipped. This is because the pulses in sections A and B of register 210 will contain inputs from the previous count and sections C and D will contain pulses from the present count, which condition could cause an erroneous check.

When the check is performed and the register is loaded with information from the new count, there are two ways in which multivibrator 237 is prevented from slipping counter 605 again. One is if the output of gate 211 sets flip-flop 215 to indicate an in-frame condition. The other occurs when gate 235 is enabled, and therefore the 1X01 pattern is assumed to be in register 210.

When the in-frame pattern of 011X is in register 210, word pulse W1 will clock the output "0" of gate 211 into flip-flop 215. The resulting "1" on lead 216 will provide an in-frame indication to controller 16 while the "0" on lead 218 will immediately reset flip-flop 230 and hold it reset until the next out-of-frame indication.

SIGNALING FRAME DETECTOR (FIG. 3)

Signaling frame detector 300 is made up of NAND gates and a 2-bit shift register. When in frame, the X bit passes from gate 231 directly into shift register 301 before any of the eight bits of the first word in the next frame arrive. Gate 302 receives digit pulse D1, word pulse W1, the in-frame signal and the input from flip-flop 220 which defines the frame immediately following the occurrence of the X bit. An output of gate 302 serves to shift the X bit into register 301. Gate 303 then detects a condition of register 301 indicating a transition in the X bit from 1 to 0.

As mentioned previously, the pattern of the X bit is 000111, 000111. The frame immediately following a transition in the X bit contains signaling in the eighth bit of each word. Thus the transition from 1 to 0 through gates 303 and 305, which are also enabled by the in-frame condition, indicates that signaling is imminent. The signal on lead 222 also controls gate 303, the output of which advises trunk scan unit 150(1) that signaling is being received. The X bit holds its value in shift register 301 for two frames, and therefore the signal on lead 222 is used to limit the output of gate 303 to only the first frame following the transition.

DEMULTIPLEXER (FIG. 6)

The demultiplexer 60(1) comprises a counting circuit 605, advantageously a ripple-type counter as known in the art, driver circuits, diode selection matrices, a flip-flop register, NAND and inhibit gates, flip-flops and delays. Inhibit gate 601 receives the inverted input from clock regenerator 200 and the inhibit input from frame detector 201. In the case that a count is to be skipped, a pulse from frame detector 201 will enable inhibit gate 601 for one clock pulse duration, thereby stopping the clock count for that one pulse.

Counter 605 has a double rail output to diode matrix drivers 610 and 611, which are simply power gates to drive the respective bit and word selection matrices 620 and 621. The selection matrices will translate a binary address to a 1 out of *n* lead output. In the case of matrix 620, the outputs are digit pulses D1 to D8, and a binary address from the three stage digit portion of counter 605 will generate a pulse on one of these eight output leads. In word select matrix 621, the outputs are word pulses W1 to W24, a 5-bit binary address producing a pulse on one of the 24 output leads.

Gate 630 is enabled on count 194 to reset flip-flop 631 which, in turn, provides a "0" output to reset counter 605. Thus counter 605 will count to 193 and then, on the 194th pulse, will be reset to 0 to begin the next cycle. The incoming clock pulse from receiving converter and clock regenerator 200 is presented to the preset lead of flip-flop 631, thereby forcing its output to the "1" condition. This in turn, removes the reset condition from counter 605 and allows the new count cycle to begin.

Gate 635 has as its inputs the counter 605 output leads $2^6$ and $2^7$. Thus during the framing period characterized by counts 192 and 193, the output of gate 635 inhibits bit select matrix 620 so that the digit pulses are not transmitted to the trunk scan units, channel units, et cetera. Counts $2^6$ and $2^7$ also are applied to NAND gate 202 in frame detector 201 to initiate the operation of that unit, as indicated heretofore.

Figure 15:
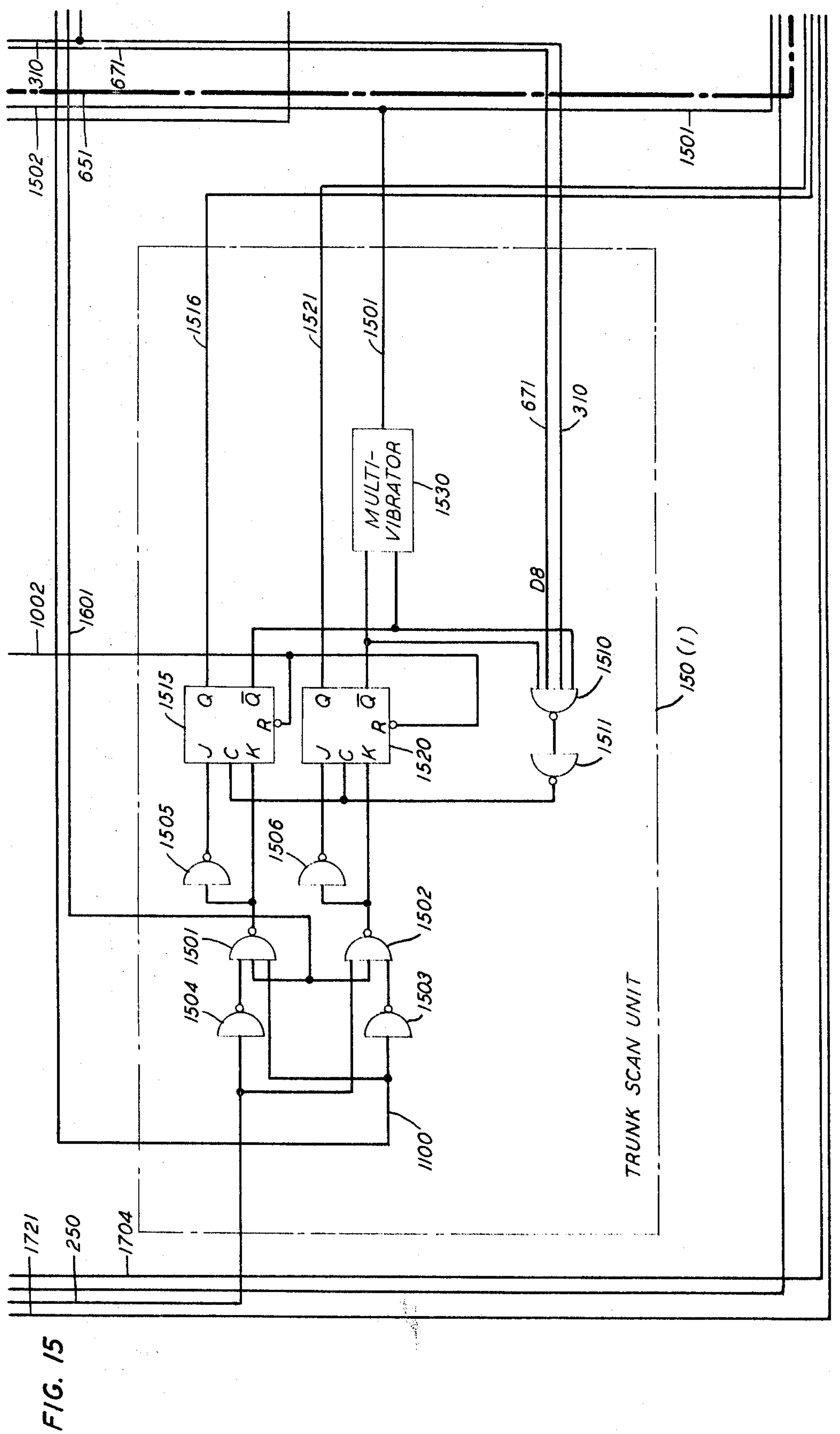
Figure 16:
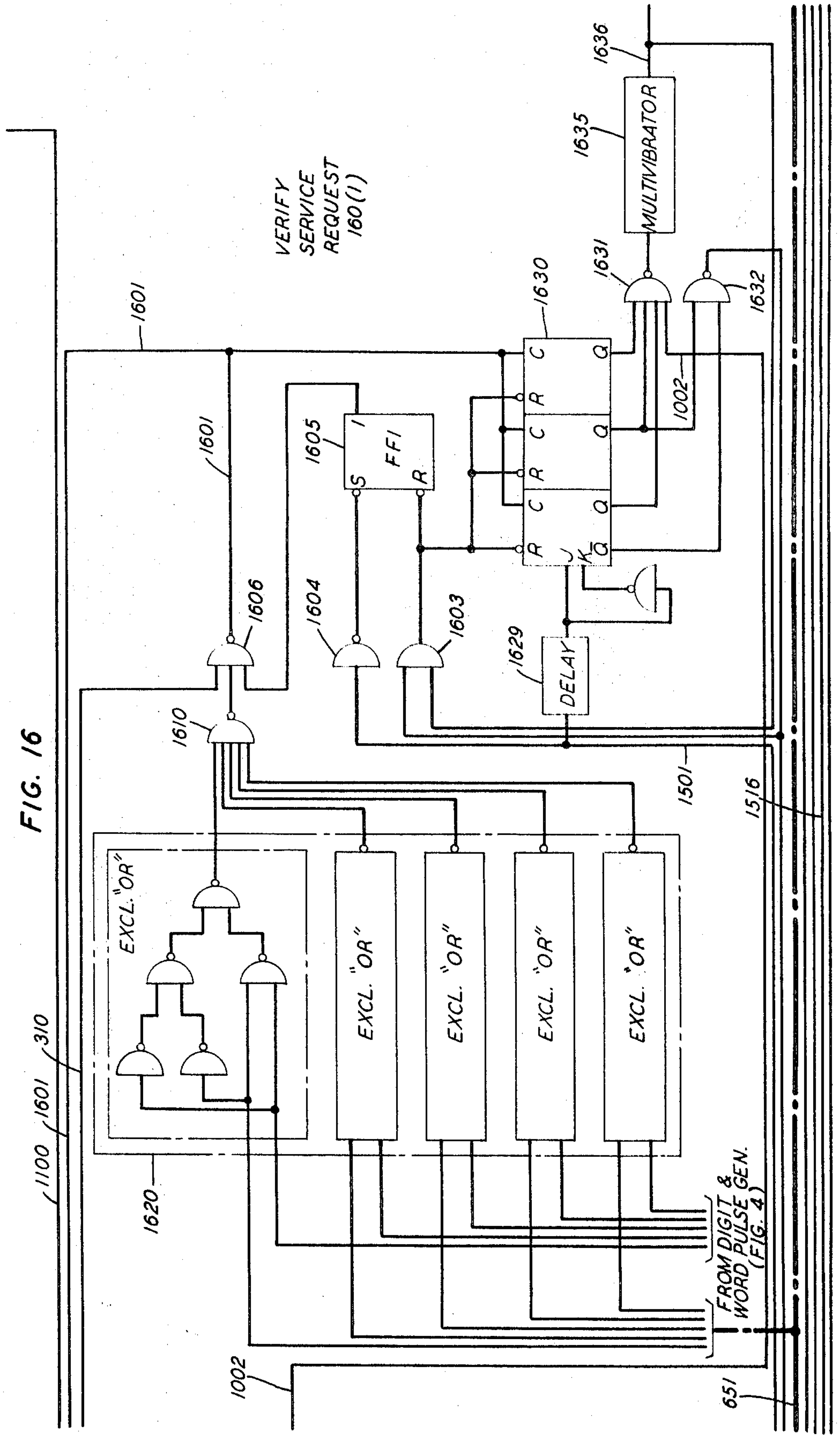
Figure 17:
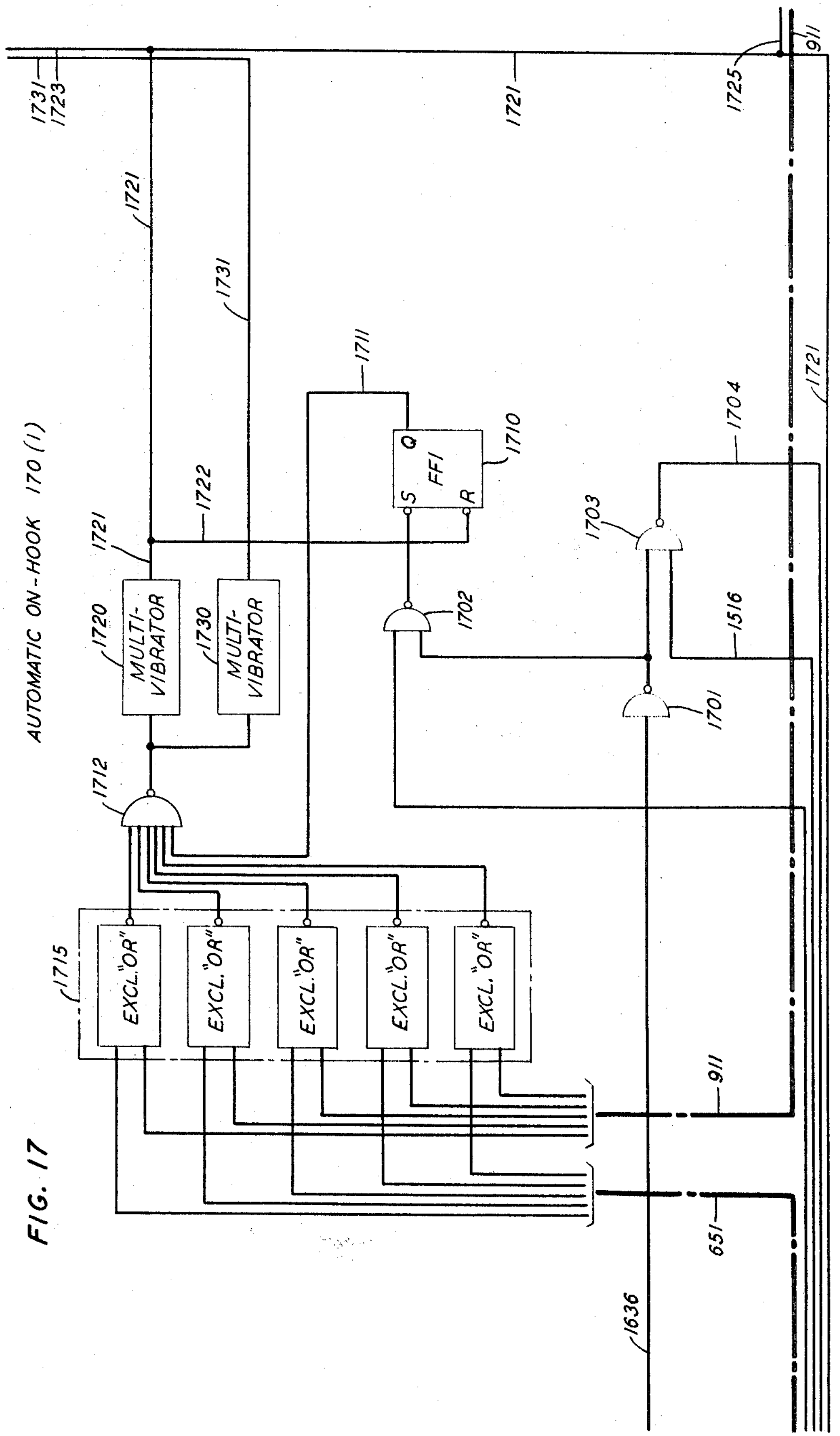

When trunk scan unit 150(1), FIG. 15, recognizes a channel requesting service, it will immediately put a pulse on lead 1501 which is then directed to register 650 via lead 1502. Upon receipt of this pulse, register 650 will record the binary address of that channel. The $\bar{Q}$ outputs of register 650 will pass immediately via cable 651 to verify service request circuit 160(1), FIG. 16, and automatic on-hook circuit 170(1), FIG. 17, for their use in comparison with other inputs. When office scan unit 100, FIG. 10, begins scanning the particular trunk in question, and if the channel requesting service on that trunk desires to go-busy, a channel read pulse on lead 1001 from office scan unit 100 will be presented to NAND gate 660 along with the trunk select pulse on lead 1002.

The output of gates 660 and 665 will clock the address of the channel in question from register 650 to controller 16 through NAND gates 652. The output of gate 660 also will be delayed in unit 661 and then passed through AND gate 662 to reset register 650 after the address has been passed to controller 16. Also an input to gate 662 from verify service request circuit 160 will clear register 650 if a search for three consecutive service requests from the channel identified therein should fail. Automatic on-hook circuit 170 also has an input to gate 662 to clear register 650. This occurs when the channel in question desires to go idle and automatic on-hook circuit 170 has completed its action and no longer needs the information in register 650.

STORE (FIGS. 7, 8, 11)

The store comprises channel units **700(1)—700(*n*) and signaling inserters 710(1)—710(*n*) serving the respective trunks 12(1)—12(*n*). Each channel unit is made up of NAND gates and an 8-bit shift register such as register 701, FIG. 7. When the entire receiving system is in frame, one of the word pulses W1—W24 from matrix 621 will occur during the time that the eight digit pulses D1-D8 of that word appear on input lead 250. Therefore, the word pulse W1 will enable shift register 701 to receive the word of information contained in the first channel on the corresponding trunk 12(1). The word pulse W1 also will enable gate 705 to pass the regenerated clock pulse from the sending terminal to shift register 701 via gate 706 and inverter 707** for clocking in the eight digits of the word in the first channel. The other channel units operate in similar fashion to store the content of corresponding channels.

When NAND gate 70 receives a dump pulse on lead 960, a locally generated framing pulse on lead 440 and the local office clock pulse on lead 450, it will clock the information out of shift register 701 through gate 702. It is then applied to switching network 190, FIGS. 19 and 20, via signaling inserter 710(1) and bus 780. The dump pulse on lead 960 also will be inverted in NAND gate 720 so as to set flip-flop 721, thereby storing the dump pulse information. The next word pulse W1, together with the output of flip-flop 721, will enable NAND gate 725 to pass the stored dump pulse through NAND gates 1100—1103 to trunk scan unit 150(1) via lead 1100 for use in performing its scanning function. Digit pulse D8 and word pulse W1 enable gate 722 to reset flip-flop 721, thereby clearing the flip-flop of the dump pulse information. Thus every time channel unit 700(1) is read out, the dump pulse will set flip-flop 721, and every time the word pulse W1 occurs, it will reset flip-flop 721. In this fashion, the dump pulse provides a current active state indication to scan unit 150(1).

Figure 11:
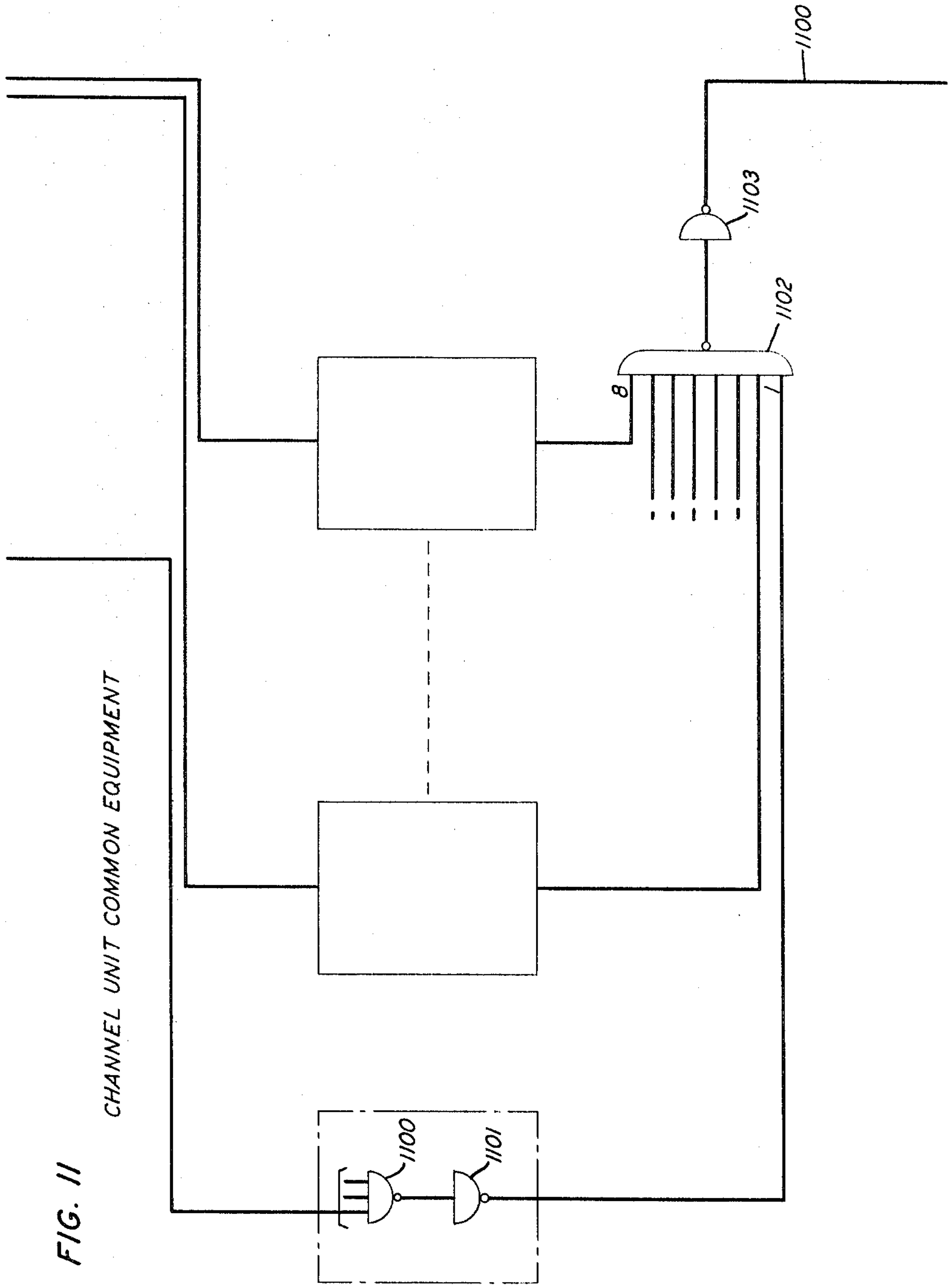

Gate 1100, FIG. 11, will receive the stored dump pulse from one of three channel units 700(1), 700(2), or 700(3), and gate 1102 will receive this information from any one of eight gates including gate 1101. Therefore, gate 1102 performs an OR function which will pass to trunk scan unit 150(1), on demand, the information that one of the channel units corresponding to trunk 12(1) has stored a dump pulse. This will be used in determining the service request status of a channel, as described hereinafter.

As mentioned previously, each of the signaling inserters **710(1)—710(*n*) stores the signaling information found in the eighth digit position of the corresponding channel in every sixth frame for later use. Unit 710(1) performs this operation for the first channel at gate 750, FIG. 7, by matching digit pulse D8 on lead 670 from matrix 620 in demultiplexer 60(1), and word pulse W1 on lead 680 from matrix 621 with the output of signaling frame detector 300(1) on lead 310, the latter pulse indicating the presence of the signaling frame. The output of gate 750 is inverted in NAND gate 751 and applied to the clock input of flip-flop 755, the other input of which is the incoming pulse train on lead 250. Thus flip-flop 755** will receive and store the signaling information which is contained in D8 of the first channel during the sixth or signaling frame.

The signaling bit is stored in flip-flop 755 until a dump pulse is received. The timing of the dumping is effected by coordinating the office generated digit pulse D8, the office generated signaling frame pulse, which denotes that this is a signaling frame, and the dump pulse from dump memory 90(1). All of these signals, together with the output of flip-flop 755, are provided at the inputs of gate 760. The output of gate 760, reflecting the information stored in flip-flop 755, will be passed to gate 765 for insertion into a selected channel in an outgoing pulse train.

The output of the corresponding channel unit 700(1), which appears on lead 766, also is received through gate 767 at an input of gate 765. It is assumed that the only time the signaling inserter circuit is useful is when the office considers the channel to be busy. Therefore, it is only necessary to assure that the busy supervision state "0" is detected when it is present on the incoming trunk signal stored in flip-flop 755, indicating that the first channel on truck 12(1) is busy, produces a "0" at the output of gate 760, which output will override whatever is received at gate 765 from channel unit 700(1). This, in turn, will produce a "1" at the output of gate 765 to indicate the busy condition for signal supervision in the inverted, outgoing channel word.

TRUNK SCAN UNIT (FIG. 15)

Trunk scan unit 150(1) is made up of NAND gates, flip-flops and a monostable multivibrator. When lead 1601 from verify service request circuit 160 provides a "1" signal on the inputs of gates 1501 and 1502, the incoming pulse train on lead 250 is compared with the dump status input from the channel units **700(1)—700(*n*) on lead 1100 to determine the dump status in that particular channel. The dump pulse for each channel is gated through OR gates, FIG. 11 so as to be presented at the inputs of gates 1501 and 1502 concurrent with the appearance in the incoming pulse train of the word pulses for the corresponding channel on lead 250**.

During a signaling frame a "0" in digit position D8 of an incoming channel indicates, in the absence of a dump pulse, that this channel, which the office previously considered to be idle, now is busy. This status will be reflected by the state of flip-flop 1515 which receives the incoming pulse train on its J and K inputs from lead 250 through NAND gates 1504, 1501 and 1505. The clock input C permits an incoming bit to be stored only during the eighth digit of a channel in the signaling frame as determined by the coincident receipt at NAND gate 1510 of the D8 and signaling frame pulses on leads 671 and 311 respectively. Thus under these conditions the Q output of flip-flop 1515 will be a "1" or "go-busy" signal on lead 1516.

Similarly, a "1" in digit position D8 of an incoming channel indicates, in the presence of a dump pulse, that this channel, which the office previously considered to be busy, now is idle. This status is reflected by the state of flip-flop 1520 which receives the incoming pulse train on its J and K inputs from lead 250 via NAND gates 1502 and 1506. This input also is clocked in flip-flop 1520 only during D8 of the signaling frame as indicated for flip-flop 1515. Thus under these conditions the Q output of flip-flop 1520 will be a "1" or "go-idle" signal on lead 1521.

In either case the first channel in the sequence during the signaling frame which sets either flip-flop 1515 or 1520 results in a "0" on one of the input leads of gate 1510. This prevents any of the following channels requesting service in that signaling frame from being recognized. Also the signal on the $\overline{Q}$ output of flip-flops 1515 and 1520 enters the monostable multivibrator 1530 and produces a pulse on lead 1501 which, via lead 1502, causes demultiplexer 60(1) to store the address of the channel under observation. It also triggers the action of verify service request circuit 160(1) which, in turn, inhibits scanning during the next two signaling frames by a signal on lead 1601 at one input of AND gates 1501 and 1502.

When office scan unit 100 comes to this particular trunk 12(1), a positive pulse will appear on the reset inputs R of flip-flops 1515 and 1520. The negative going portion of this pulse will reset these flip-flops in preparation for the next signaling frame. It is assumed that office scan unit 100 will be able to search through every trunk 12(1)—**12(*n*)** between signaling frames.

VERIFY SERVICE REQUEST CIRCUIT (FIG. 16)

This circuit is made up of NAND gates, one AND gate, a shift register, a flip-flop, a monostable multivibrator and some exclusive-OR circuits. The initiating pulse for this circuit comes from multivibrator 1530 in trunk scan unit 150(1). This provides a pulse on lead 1501 that is inverted in NAND gate 1604 and sets flip-flop 1605. In the normal state flip-flop 1605 is reset, placing a "0" on the input of gate 1606. This results in a "1" on output lead 1601, allowing trunk scan unit 150(1) to search through all channels of the pulse train on trunk 12(1) for service requests.

Once flip-flop 1605 has been set, the "1" output pulse is applied to gate 1606, and control of this gate is transferred from flip-flop 1605 to NAND gate 1610. The inputs for gate 1610 come from detecting or comparing circuit 1620 which matches or attempts to match the address of the channel currently stored in demultiplexer 60(1) with the binary address received from word pulse generator 405.

Since in the initial trunk scan the address in demultiplexer 60 was stored during the eighth digit of the channel, the binary address for this channel will very quickly change, losing the matching state in comparing circuit 1620 and resulting in a "1" from gate 1610 and a "0" output from gate 1606 to inhibit further scanning in trunk scan unit 150(1). A rematch will not occur until this channel address is received from generator 405 in the next signaling frame. The pulse from multivibrator 1530 is delayed in circuit 1629 and then clocked into shift register 1630 by the output of gate 1606. Now that flip-flop 1605 has been set, trunk scan unit inhibit lead 1601 will contain a "0" so long as compare circuit 1620 fails to provide a match. This is the result for every channel other than the one under consideration.

When the desired channel is observed in the next signaling frame, compare circuit 1620 matches the word count and the stored address of the channel thereby producing a "1" on the output of gate 1606 and allowing trunk scan unit 150(1) to again scan this particular channel. If a request for service is detected at this time, the pulse on lead 1501 from trunk scan unit 150(1) applies a "1" to the input of shift register 1630. This pulse is clocked in as soon as the word count advances to the next word and the output of gate 1606 changes to a "0."

The sequence continues for a third time, and if a "1" again is applied to the input of register 1630, gate 1631 will have "1's on three of its input leads. These inputs, coupled with a signal from office scan unit 100 on trunk select lead 1002, enable gates 1631, which in turn, will enable multivibrator 1635 to provide an output pulse. This pulse is an indication that the trunk currently being scanned by office scan unit 100 has in it a channel which has a verified service request. It will be transmitted via lead 1636 to automatic on-hook circuit 170(1) for further action.

If, however, during one of the verification scans of the channel in question, trunk scan unit 150(1) failed to detect a request for service, a "0" will be clocked into shift register 1630. This will result in a condition which will produce a "0" on the output of gate 1632. The consequent output of gate 1603 will reset flip-flop 1605 and shift register 1630, putting the verify service request circuit back into its idle state and allowing trunk scan unit 150(1) to continue its scan of all channels.

AUTOMATIC ON-HOOK CIRCUIT (FIG. 17)

This circuit is made up of NAND gates, flip-flops, two multivibrators and an exclusive-OR circuit. When office scan unit 100 scans trunk 12(1) and verify service request circuit

160(1) produces an output indicating that a channel service request has been verified, this output on lead 1636 is inverted in NAND gate 1701 and applied to NAND gates 1702 and 1703. If trunk scan unit 150(1) has determined that the channel is originating a call, a "1" will appear on the "go-busy" lead 1516 at the input of gate 1703 so that, in conjunction with the pulse from verify service request circuit 160(1), gate 1703 will be enabled to signal office scan unit 100 on lead 1704, indicating the service origination on some channel in trunk 12(1).

However, if the go-idle condition has been detected by trunk scan unit 150(1), a "1" will appear on one input of gate 1702 which will result in flip-flop 1710 being set. The resulting "1" on output lead 1711 will allow gate 1712 to be under the control of compare circuit 1715. Subsequent operations determine the particular outgoing channel which is to be made idle. Since no record is kept to identify which incoming and outgoing channels are interconnected, dump memory 90(1) is interrogated. It contains the identities of the busy incoming channels in a reordered sequence suitable for readout of store 70(1) in the outgoing channel sequence. Thus compare circuit 1715 simply compares each output of dump memory 90(1) with the incoming channel address stored in demultiplexer 60(1). A match indicates the channel into which information received in the incoming channel is being dumped and that this outgoing channel should now be made idle. This match, in conjunction with the "1" on lead 1711 at the input of gate 1712, will permit multivibrator 1720 to provide an output pulse which will reset flip-flop 1710 via leads 1721 and 1722. This output will also be directed to the load gates of dump memory 90(1) via leads 1721 and 1723 and to switch control memory 180(1) via leads 1721 and 1725, thereby idling that specific outgoing channel. This pulse also will clear register 650 in demultiplexer 60(1) via lead 1721. The output of multivibrator 1730 on lead 1731 will provide an indication in busy-idle status memory 140(1) via lead 1210 that this particular time slot is now idle.

Figure 10:
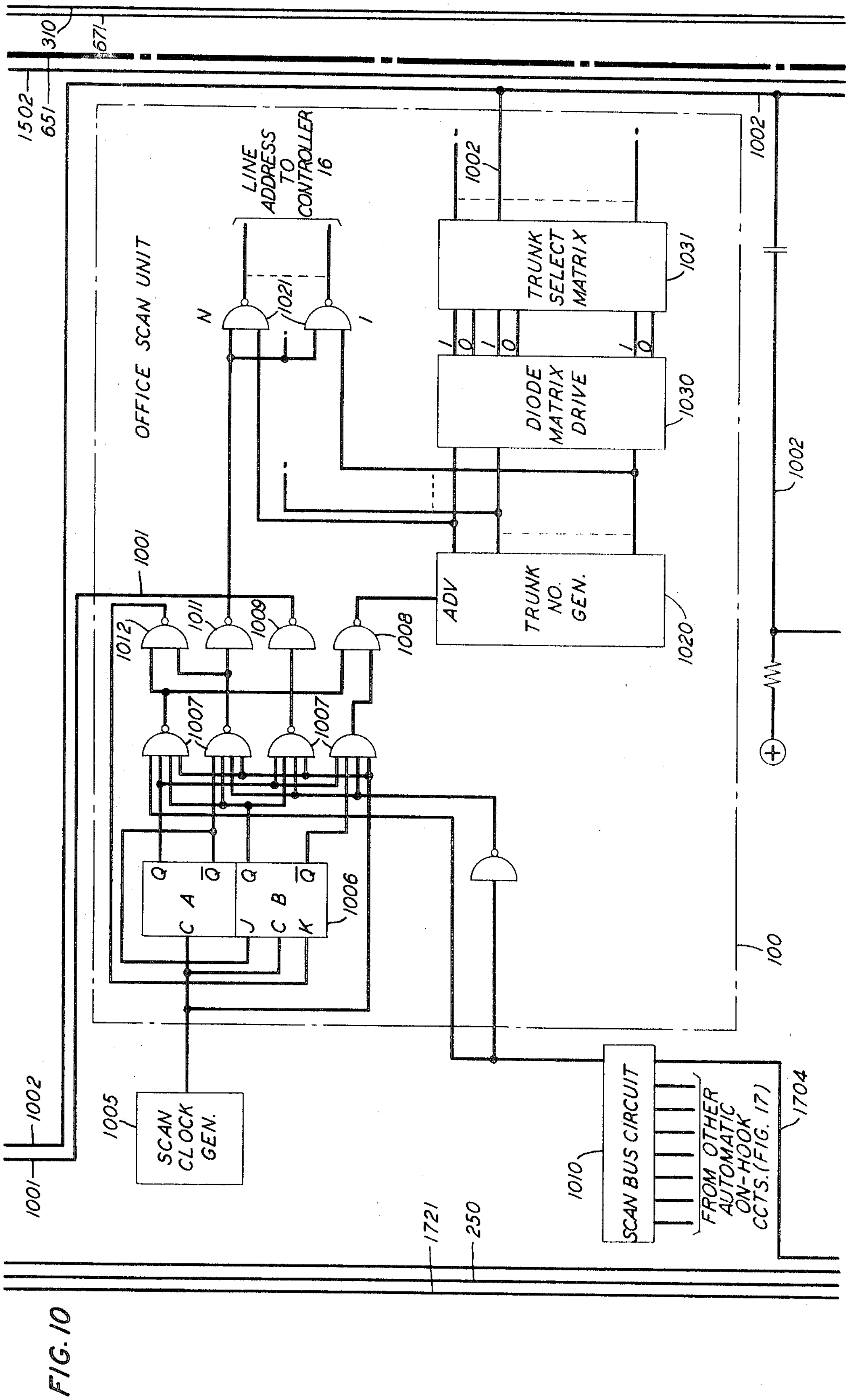

Office Scan Unit (FIG. 10)

Office scan unit 100 is made up of flip-flops, NAND gates, a ripple counter, diode matrix drivers and a select matrix. The office scan unit cycles through all trunks 12(1)—**12(*n*) coming into the office checking all of the trunk scan units, such as 150(1), and verify service request circuits, such as 160(1), to determine whether any channel is currently requesting service. If not, the next trunk will be examined. If a channel is requesting an origination, the channel and trunk addresses are reported to controller 16** to begin the necessary control operation.

Scan clock generator 1005 enables flip-flops 1006 to provide a counting function. In the normal case, the outputs of flip-flops 1006 and gates 1007 will produce a sequence which recycles with every two clock pulses from scan clock generator 1005, resulting in a pulse being produced at the output of gate 1008 which advances trunk number generator 1020 to the next count. If a service request pulse is received in scan bus circuit 1010 from automatic on-hook circuit 170(1), indicating that a channel in trunk 12(1) is requesting service, the cycle of flip-flops 1006 and gates 1007 is altered so as to be four clock pulses long. The first pulse is a pause-and-wait pulse. The second pulse goes to demultiplexer 60(1) via NAND gate 1009 and lead 1001, serving to gate the channel address stored in register 650 to controller 16. The third pulse passes through NAND gate 1011 to gates 1021 so as to inform controller 16 of the binary address of the trunk currently being scanned, as derived from trunk number generator 1020. The fourth pulse passes through gate 1008 and advances trunk number generator 1020 to the next trunk number. Trunk number generator 1020 is a binary ripple counter, the output of which is applied to diode matrix drive circuit 1030, composed of power gates. The output of circuit 1030 is applied to trunk select matrix 1031, which results in a pulse being transmitted over one of a number of leads, for each applied binary address, corresponding to the number of trunks 12(1)—12(n) coming into the office.

Figure 9:
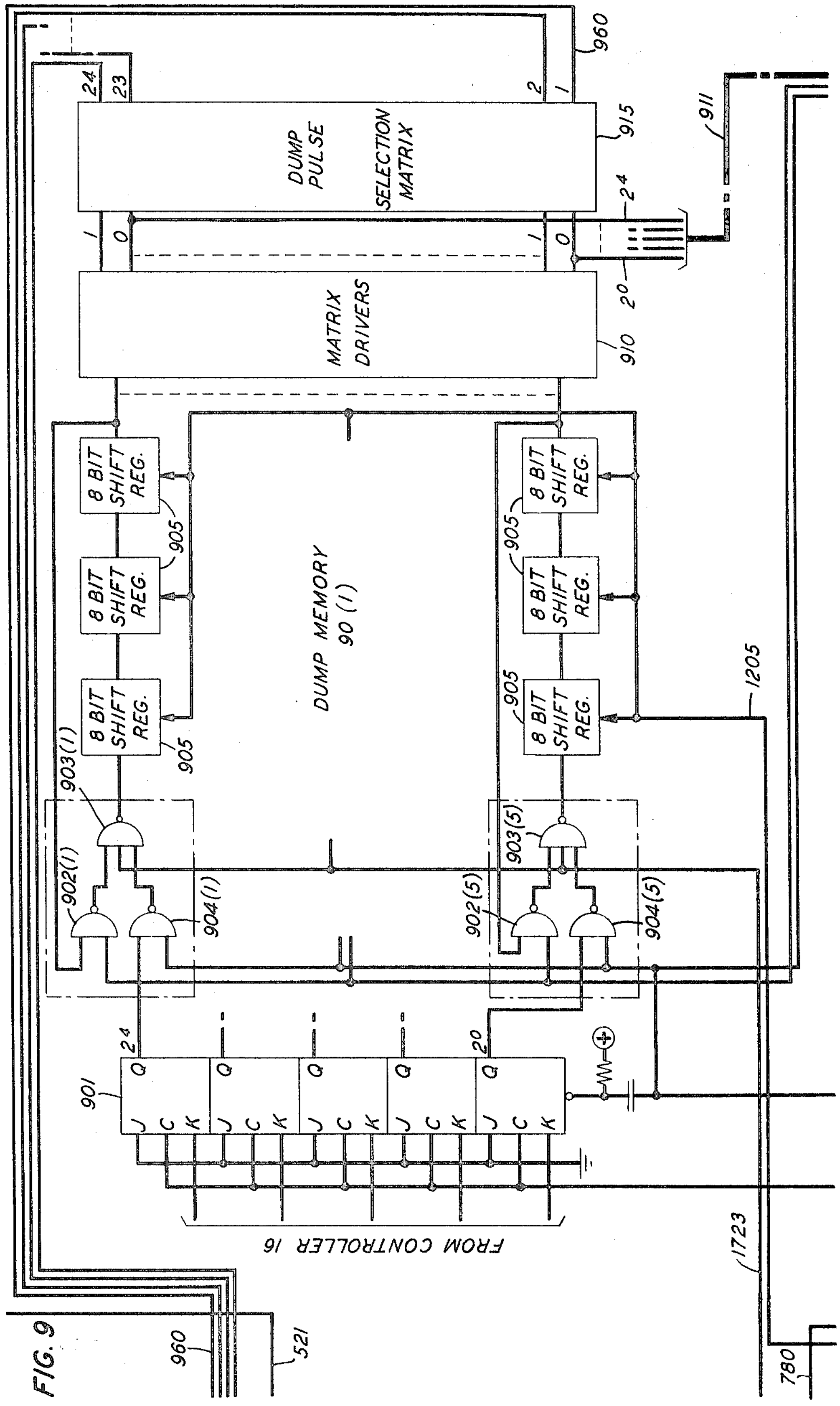
Figure 13:
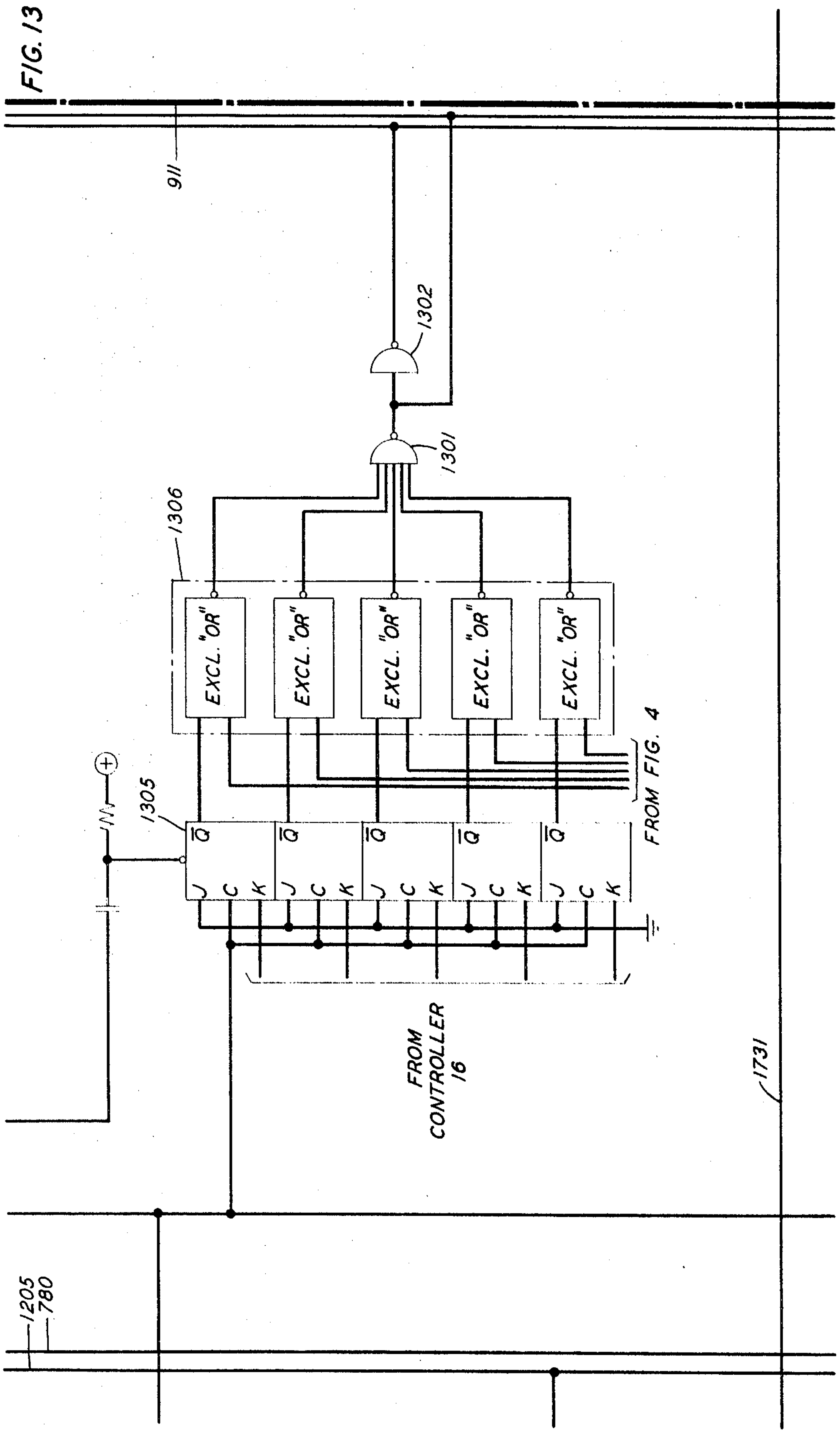

Dump Memory (FIGS. 9, 13)

This is a cycling memory which is made up of flip-flops, NAND gates, shift registers, matrix drivers and a diode selection matrix. Dump memory 90(1) must store words sufficient to accommodate 24 channel units. A binary address of five digits is sufficient to identify a channel unit. Thus to accommodate 24 of these five digit words, dump memory 90(1) is made up of five rows of shift registers 905, each row containing three, 8-bit registers.

Under normal circumstances the output of cycle gate 1301, FIG. 13, is a "1," and the output of load gate 1302 is a "0." Therefore the output of the dump memory, as it appears at the input of matrix drivers 910 (FIG. 9) and also as it appears at the inputs of gate 902(1)—902(5), is read directly back into memory and therefore recycled. When a pulse from automatic on-hook circuit 170(1) is received on lead 1723, which requests that a time slot be made idle, a ground is put on the inputs of gates 903(1)—903(5). This results in a "1" at the output of gates 903(1)—903(5) and, with the receipt of a pulse from memory shift clock generator 1200 on lead 1205, "1'a" are shifted into that time channel in the shift registers 905 of dump memory 90(1). An all "1's" code is an idle code.

The output of dump memory 90(1) goes through matrix drivers 910 to provide a double rail powered output. The output goes to dump pulse selection matrix 915 which, for every address presented to it, results in a "1" being put on one of the 24 output leads, such as lead 960. Thus a dump pulse is presented to one of the 24 channel units 710(1)—710(24) unless the idle code is present.

The output of matrix drivers 910 is also the binary address of a channel unit 710(1)—710(24). This output of the dump memory in binary code form is returned via lead 911 to automatic on-hook circuit 170(1) for the "make-idle" comparison as described previously.

Figure 12:
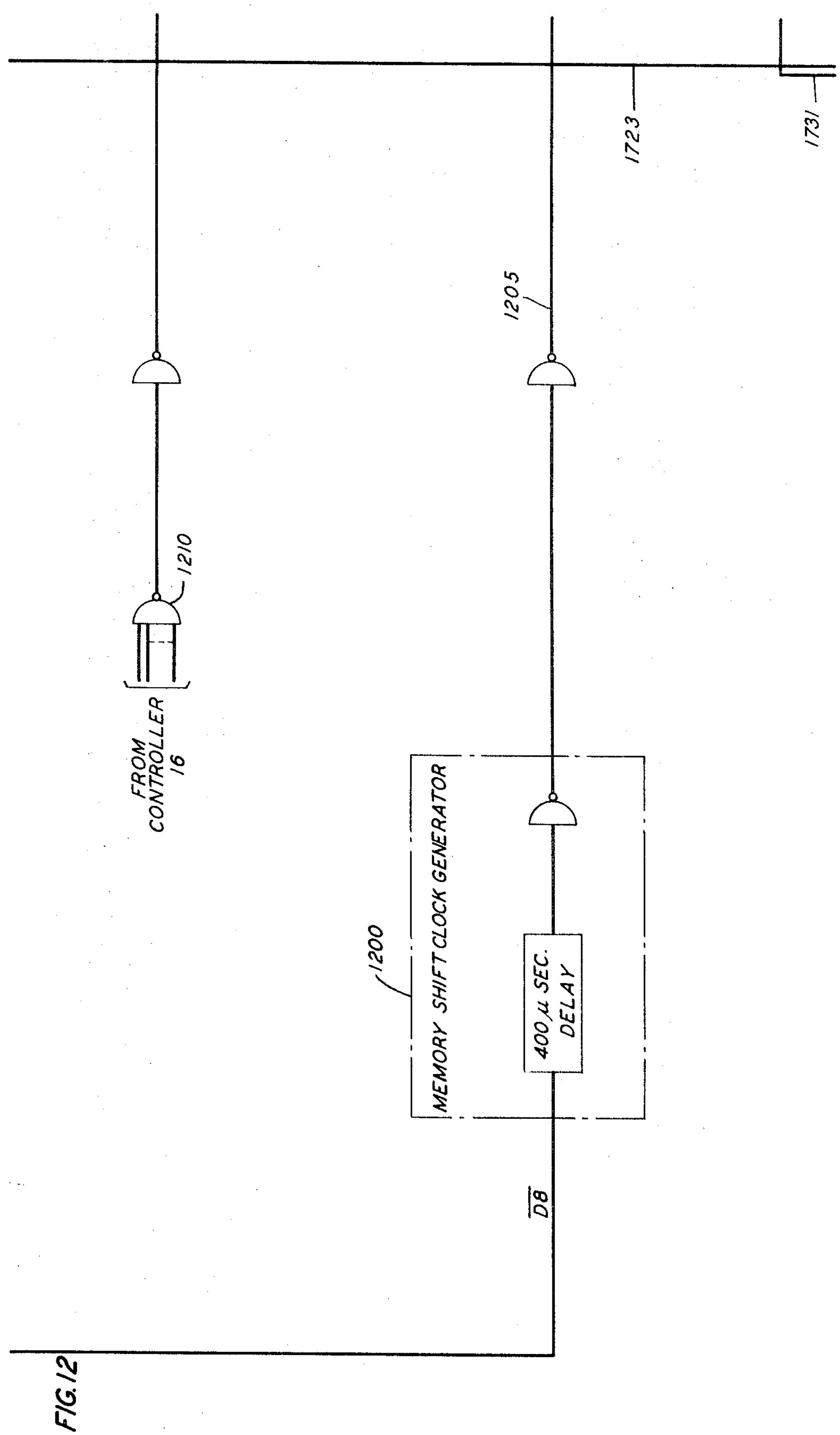

If processor 15 wants to insert a new channel address into dump memory 90(1), it presents the address of trunk 12(1), with which dump memory 90(1) is associated, to gate 1210, FIG. 12, the address of the incoming channel to registers 901, FIG. 9, and the number of the outgoing channel into which the information is to be dumped to registers 1305, FIG. 13. It then must release completely. However, at the same time, it may also present to switch control memory 180(1) the binary address of the cross-point to be operated in the outgoing channel.

When the output of register 1305 matches, in compare circuit 1306, the binary address of the channel currently recorded in office scan unit 100, the output of cycle gate 1301 is a "0" and the output of load gate 1302 is a "1." Ground on the inputs of gates 902(1)—902(5) now results in a blocking of the recycle operation. Therefore the output of dump memory 90(1) does not reenter, but instead the "1" on the input of gates 904(1)—904(5) from load gate 1302 results in the loading of information stored in channel address register 901 into the shift registers 905 through gates 903(1)—903(5). This of course, is accomplished upon receipt of the pulse from memory shift clock generator 1200 on lead 1205. As soon as the office counter has advanced to the next count, compare circuit 1306 no longer matches correctly, and the original condition for recycling of the memory is restored. Thus one new word is loaded into the shift registers 905. When the output of load gate 1302 returns to ground, the information that was stored in address registers 901 and 1305 is released.

Figure 18:
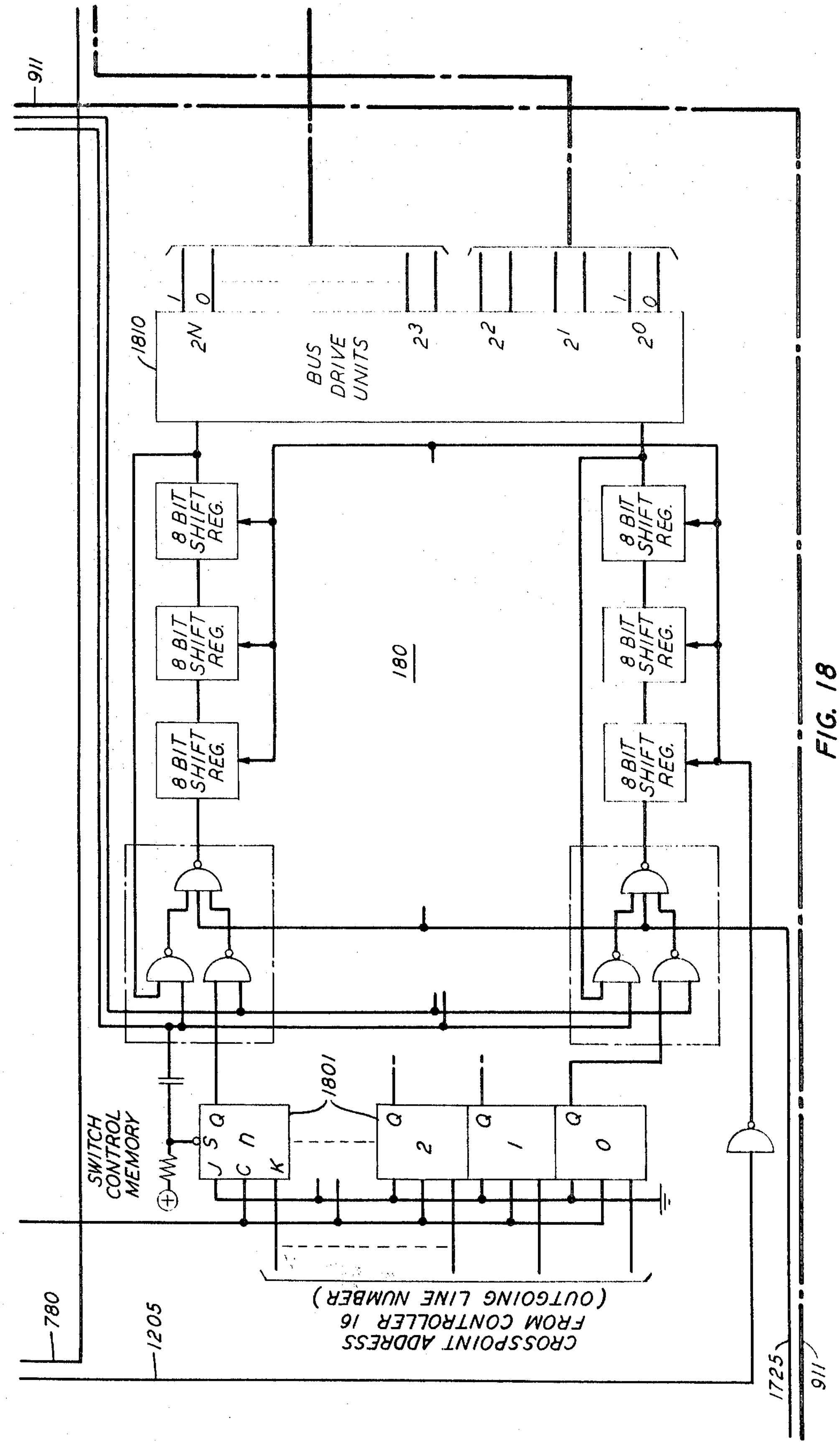

Switch Control Memory (FIG. 18)

Memory 180 is essentially the same as dump memory 90(1). As mentioned previously, processor 15, when it loads dump memory 90(1) will also present to address register 1801 the address of the cross-point to be operated in the outgoing channel. This memory may have as many rows as necessary to produce the binary number of the highest numbered trunk in the office. This output is presented to bus drive units 1810 which send out double rail binary addresses to the cross-points themselves. As with the dump memory, the recycle and load pulses from gates 1301 and 1302, FIG. 13, control the timing and operation of switch control memory 180.

Figure 14:
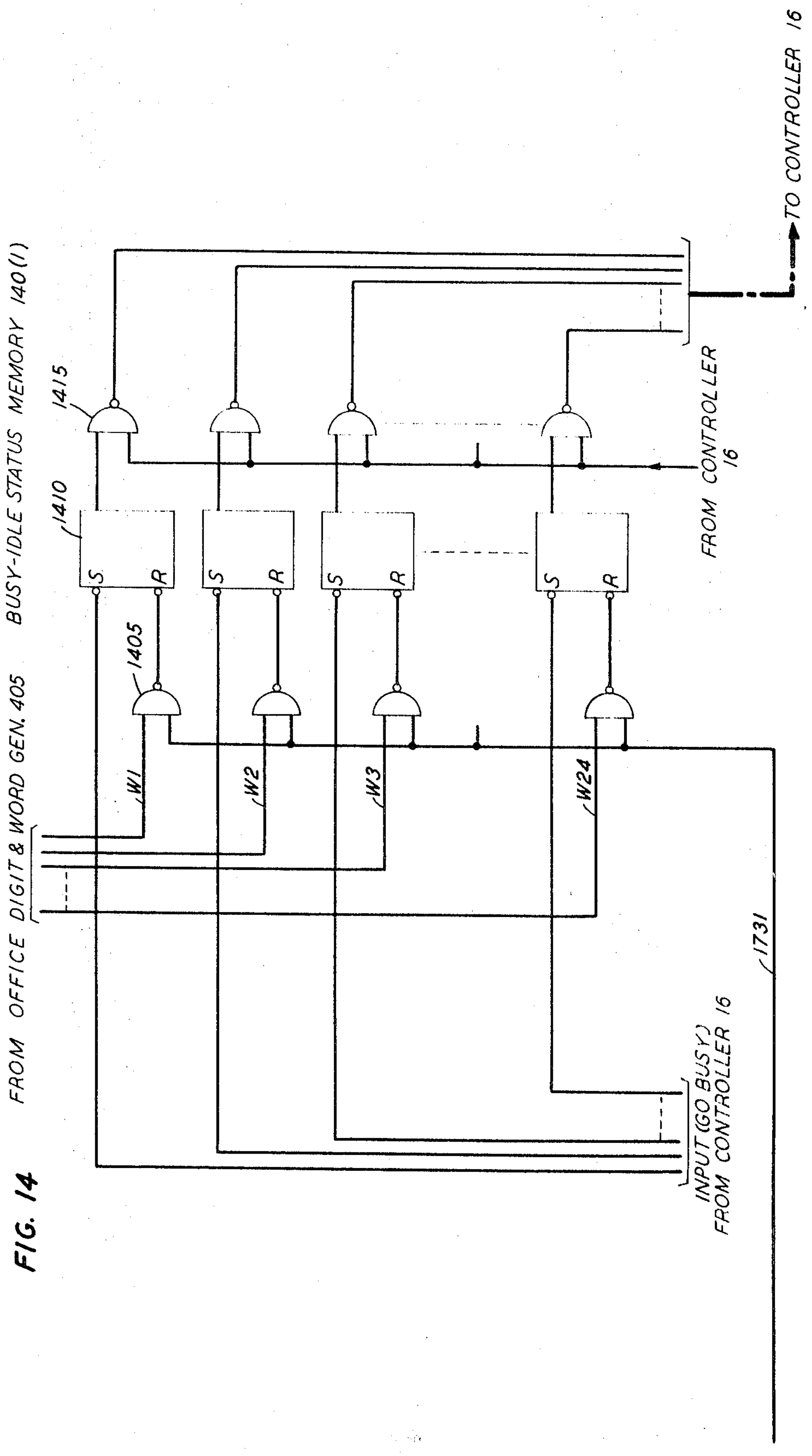

Busy-Idle Status Memories (FIG. 14)

The busy-idle status memory 140(1) is simply a circuit with 24 flip-flops 1410 for storage of one bit each, a gate 1405 per flip-flop for gating in information, and a gate 1415 per flip-flop for gating out information. The input to a flip-flop 410 can come from processor 15 via controller 16 which may set any of them, indicating that the time channel associated with that flip-flop has been made busy. Automatic on-hook circuit 170(1), in conjunction with the word pulse from generator 405, will reset the selected flip-flop 1410 at the same time that the channel is made idle. Output gates 1415 are gated from controller 16 so as to present simultaneously to processor 15 the 24 bits identifying all channels in trunk 12(1) associated with this memory 140(1). Thus the processor can find idle or busy channels as necessary.

Figure 19:
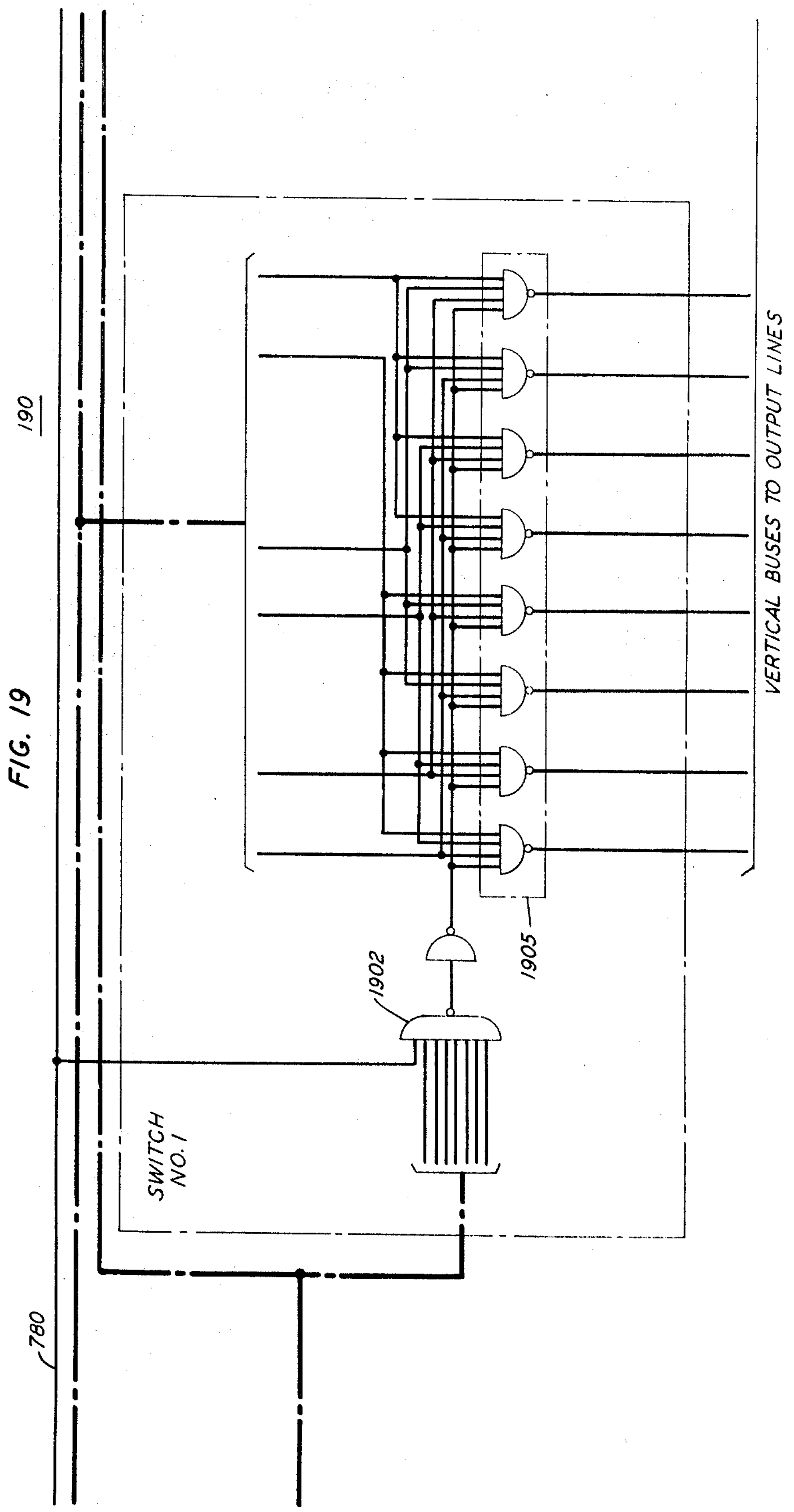

Switching Network (FIGS. 19, 20)

Associated with each incoming trunk are a number of circuits that make up the switching network. These circuits are actually 1×8 switching matrices comprising as many cross-point switches per input trunk as there are output trunks divided by eight. Switch control memory 180 presents a binary address to all of the cross-point switches associated with it. The three least significant bits of the binary address enable one of the eight gates 1905 in every switch so addressed. The most significant digits after the first three appear double rail as required by gate 1902. Each switch is wired differently at gate 1902 so that the most significant bits will allow the pulse train from channel unit output bus 780 to pass through gate 1902 in only one of the switches associated with switch control memory 180. The pulse train then of course, passes through whichever one of gates 1905 have been actuated by the three least significant bits and is applied to an outgoing trunk unit, FIG. 5, or through other stages of the switch.

Figure 4:
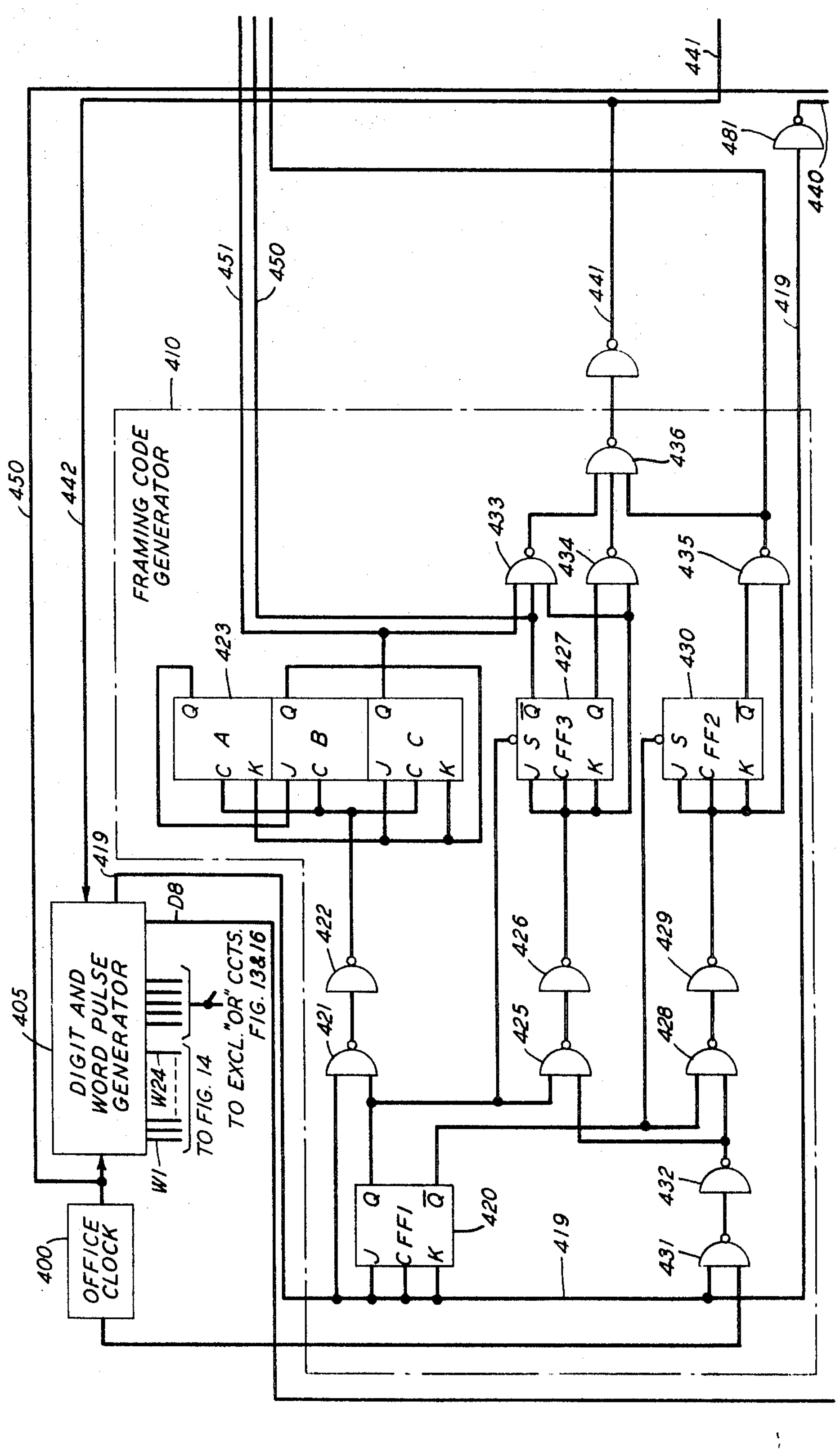

Clock Circuit (FIG. 4)

During pulses 192 and 193 the tandem office will generate and insert in the outgoing pulse train the correct framing pulses. As previously described, the pattern is 01, 1H, 01, 1X repetitively and the pattern of the X bit is 0011100111. During intervals 192 and 193, a pulse is generated by digit and word pulse generator 405 which covers that two pulse interval. This frame pulse appears on lead 419 at the respective inputs of flip-flop 420, gate 421 and gate 431. At gate 431, it allows office clock 400 to insert two pulses into framing code generator 410. It changes the state of flip-flop 420 upon each appearance. Therefore, it will pass through gate 421 on alternate appearances thereat.

Every other framing pulse will result in the $\overline{Q}$ output of flip-flop 420 being a "1" which appears at the set input of flip-flop 430. The appearance of a "1" on the input of gate 428, and the appearance of a clock pulse which has passed through gate 431, changes the state of flip-flop 430. However, with the leading edge of that clock pulse at the input of gate 435, the output of gate 435 will remain a "1" since the output of flip-flop 430 is still a "0" from the previous setting. On the falling edge of that first clock pulse, the state of flip-flop 430 changes. Thus the next clock pulse that appears at gate 435, with a "1" on the output of flip-flop 430, will produce a "0" at the output of gate 435. This "0" signal is transmitted through gate 436 and becomes a "1." This results in the creation at the output of gate 436 of a 01 pulse pattern during every other frame.

When the Q output of flip-flop 420 is a "1," the framing pulse is allowed to pass through gates 421 and 422 to actuate a 6-bit counter 423 which has the properties that the output of section C is a "1" for three counts and a "0" for three counts. The Q output of flip-flop 420 also allows the clock pulse from gate 431 to pass to flip-flop 427 through gates 425 and 426. The first clock pulse that comes through gate 425 is allowed to pass through gate 434, resulting in a "1" at the output of gate 436. On the falling edge of the clock pulse, the state of flip-flop 427 changes, so that the next pulse that arrives through gate 425 (the second of the framing pulses) does not pass through gate 434 but is instead directed to the input of gate 433. The output of gate 433 is controlled by the output of the third stage of counter 423, resulting in an output for the second pulse of every other frame from gate 436 of "0" three times and then "1" three times; viz., the X bit. The outputs of gates 433—435, therefore, have resulted in the production at the output of gate 436 of the framing pulse pattern 011X, interleaved by a series of "1's" during the remainder of each frame, i.e., the 24 channels.

Figure 5:
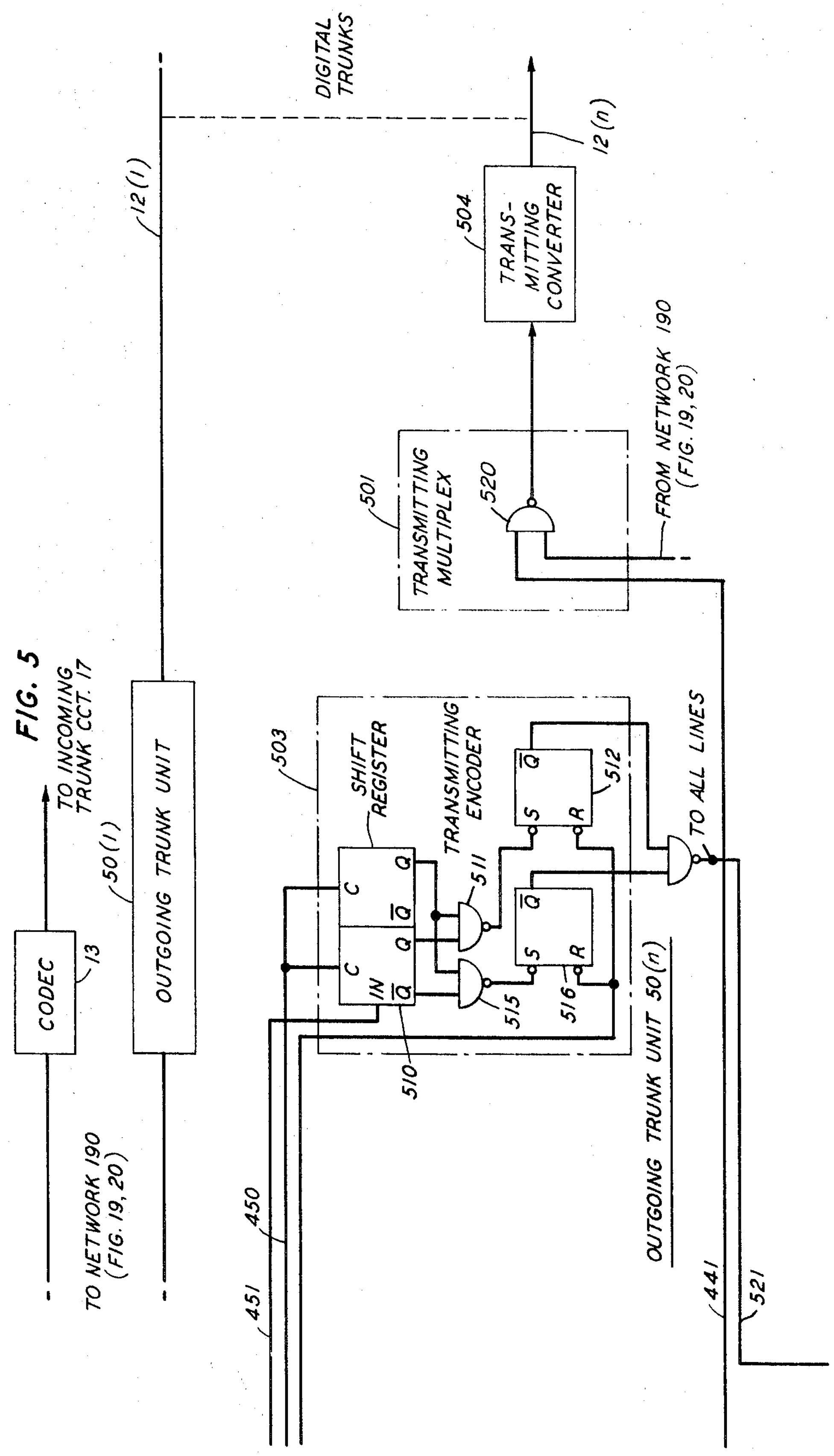
Figure 6:
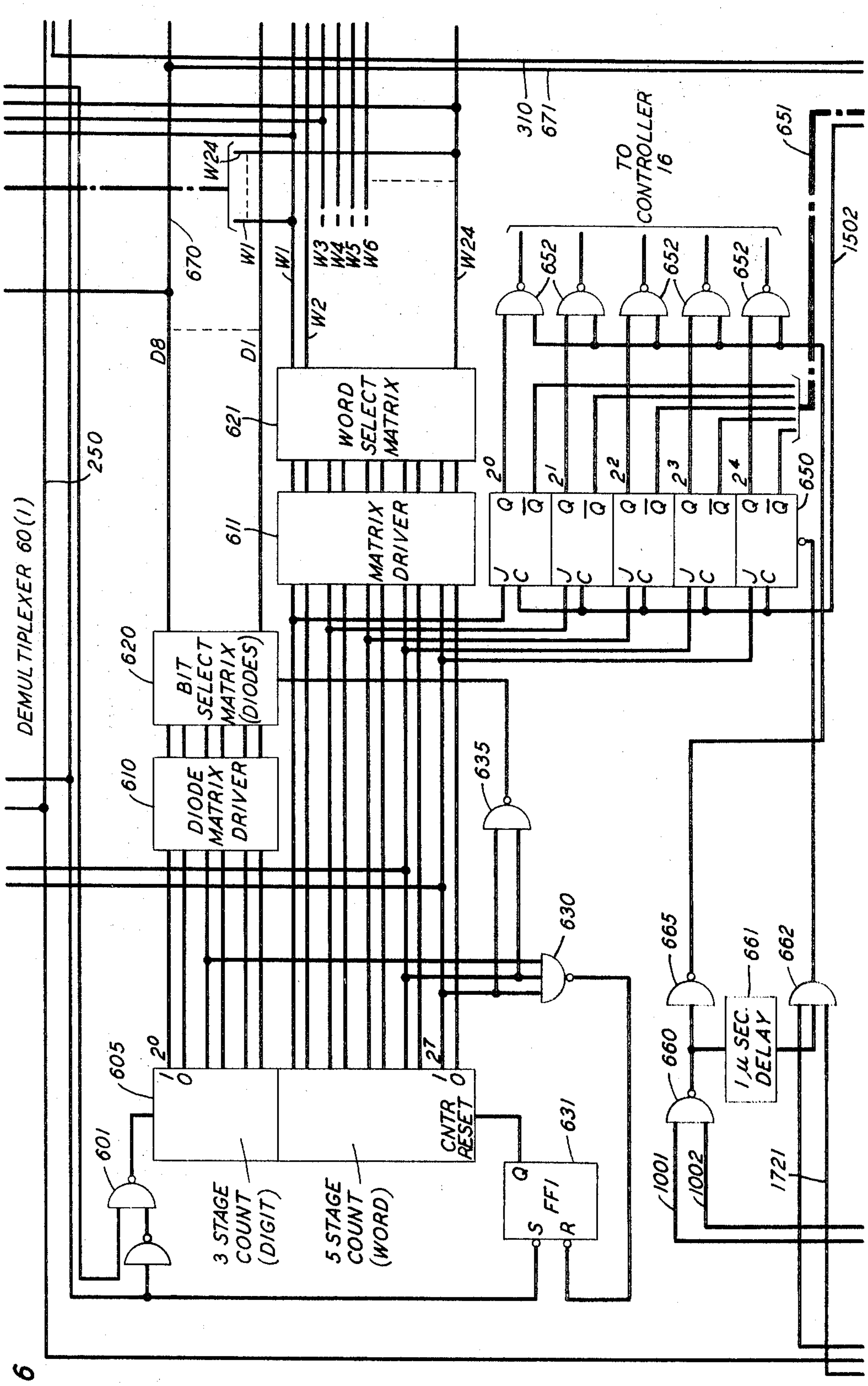
Figure 7:
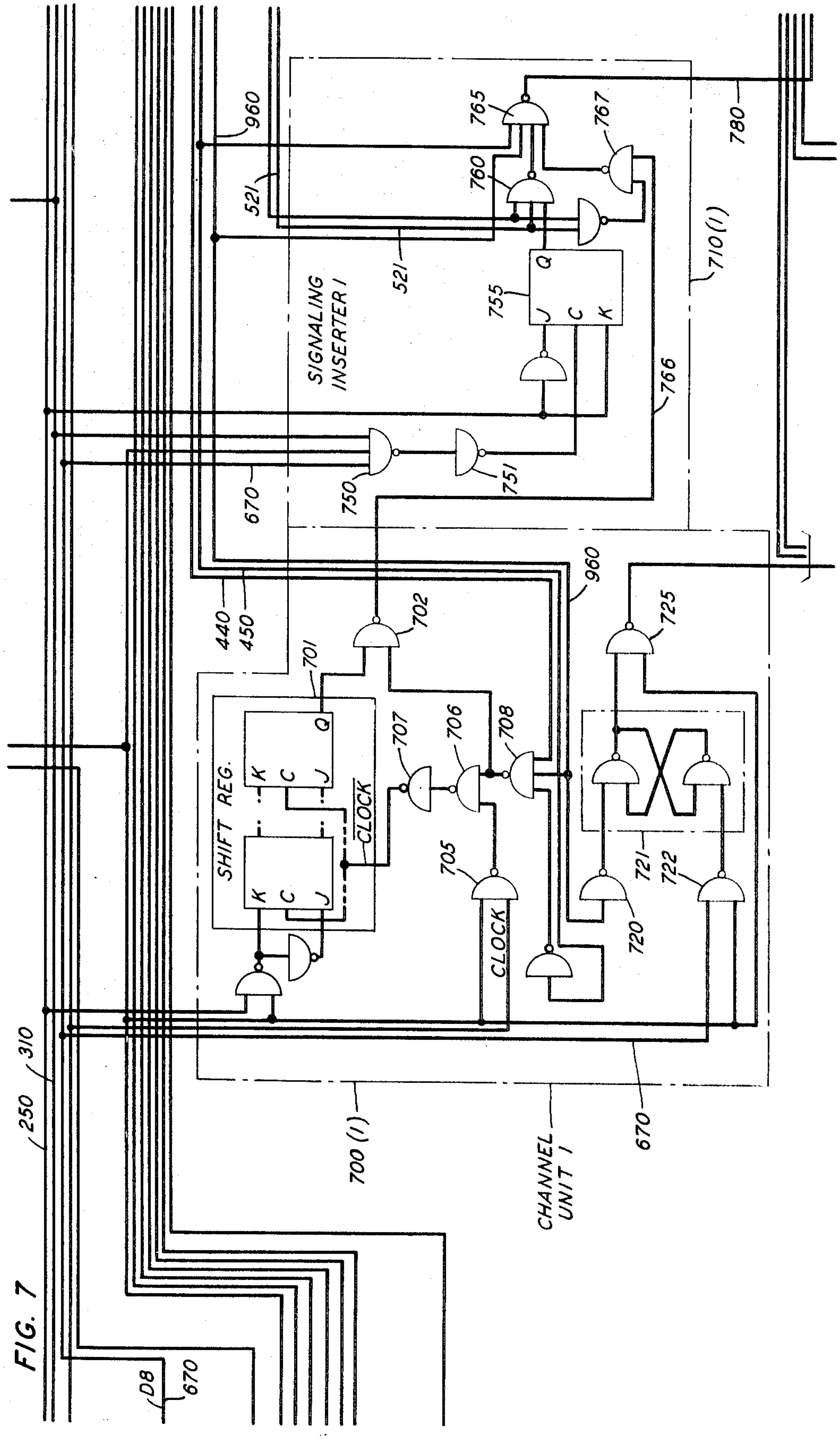
Figure 8:
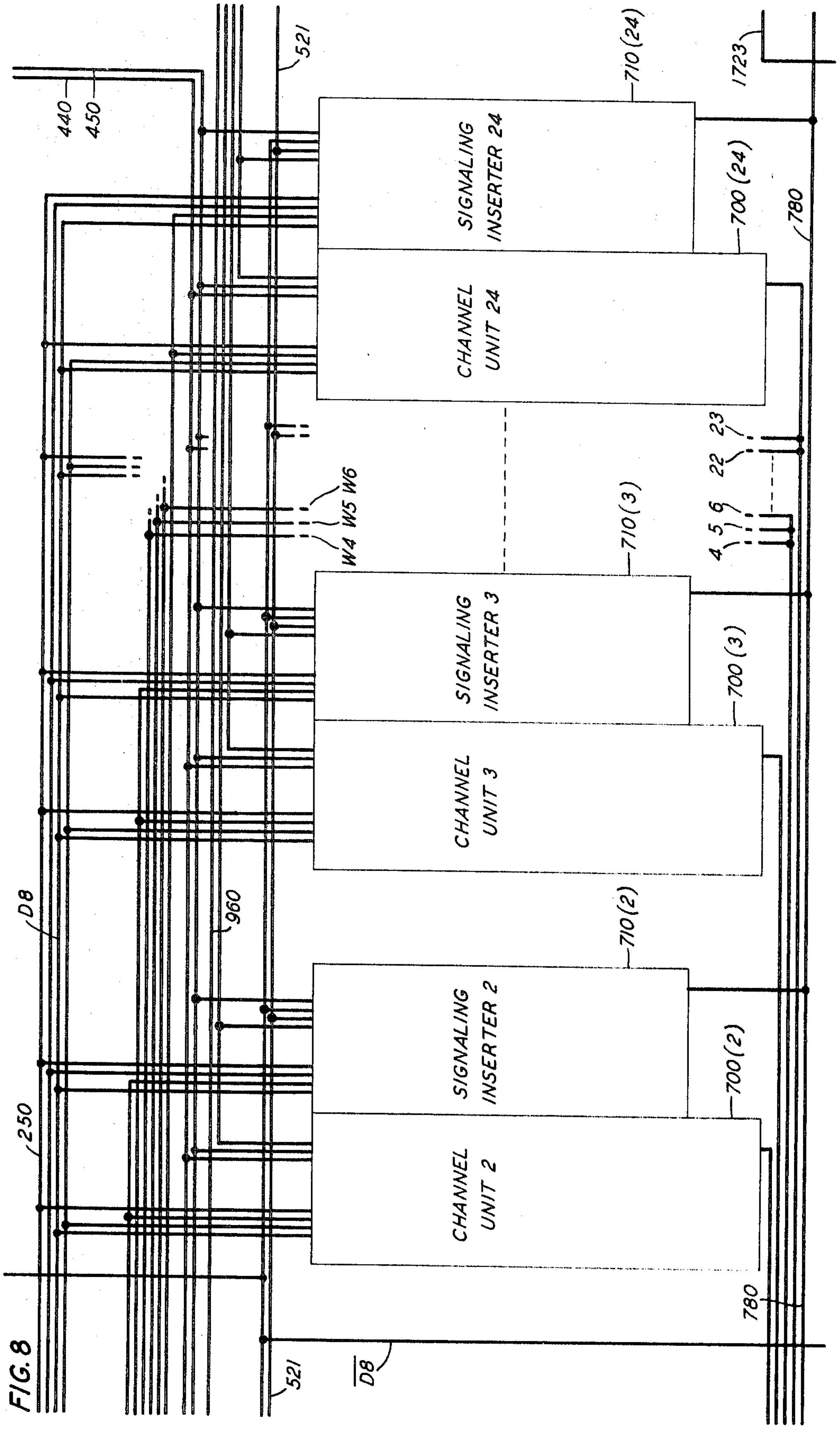

Outgoing Trunk Unit (FIG. 5)

Each outgoing trunk unit, such as 50(*n*) in FIG. 5, consists of an encoder 503, a multiplexing circuit 501 and a converter 504. Encoder 503 inserts signaling information in the outgoing pulse train at D8 of every channel during the signaling frame, which frame begins immediately after the occurrence of a transition in the X bit. The input on lead 450 from framing code generator 410 clocks the X bit on lead 451 into shift register 510. The clock for shift register 510 is the second of the two framing pulses. Transmitting encoder 503 is arranged so that gate 515 will provide a "0" output only when shift register 510 indicates that the X transition has gone from 1 to 0, gate 511 will provide the "0" only when the X transition is 0 to 1. This "0" output sets flip-flop 512 or 516. The next framing pulse that occurs after the transition has been recorded resets the previously set flip-flop 516 or 512 to prevent signaling information from being placed in the eighth bit position of every word in the two frames following the transition rather than only in the first frame, as required. The S inputs of flip-flops 512 and 516 are alternating current coupled.

The $\bar{Q}$ output of flip-flops 512 and 516, which is a "1" after the corresponding transition and during the signaling frame, enables gate 760 in signaling inserter 710(1) via lead 521 and its counterpart in all of the channels of all of the outgoing trunks in the office. The other inputs to gate 760 and the following gate 765 are the office digit pulse D8 and the signaling state of the given channel as received from the incoming trunk 12(1). This latter signal of course will change for each channel. Thus the output of gate 765 will be the signaling pulse for insertion in the eight digit position of the channel currently being transmitted through switching network 190 to the outgoing trunk unit 50(*n*).

The inverted intelligence pulse train from switching network 190, and the inverted framing pulse train Connection lead 441 from framing code generator 410 will appear at gate 520 in transmitting multiplex circuit 501. Each of these signals is a "1" when they are not themselves providing information. Thus during the 24 channels of intelligence signals, the framing pulse train is a sequence of "1's" at the input of gate 520. During the framing interval, in turn, the intelligence pulse train is all "1's." Therefore, at any given time, one of the input leads to gate 520 contains "1's" to reflect its idle condition, thereby allowing the active lead to control gate 520. The output of gate 520 is applied to transmitting converter 504 for conversion into bipolar form and subsequent transmission, in this instance, over trunk 12(*n*) as the complete outgoing pulse train.

Establishment of a Calling connection

Operation of the time division portion of the tandem office may best be understood from consideration of typical operations which it performs. Consider, for example, that a call connection is to be established between channel 10 on trunk 12(1) and channel 20 on trunk 21(*n*).

Figure 2:
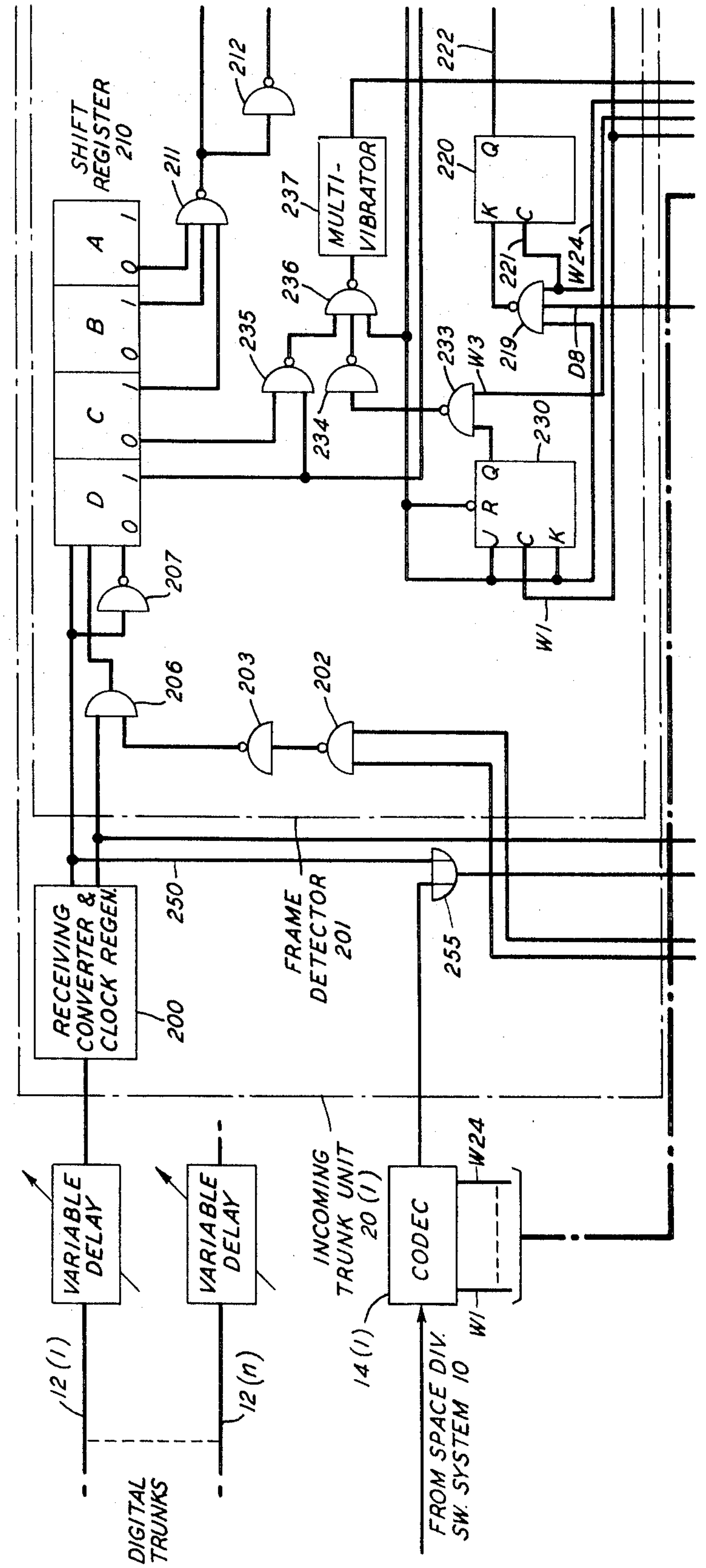
Figure 3:
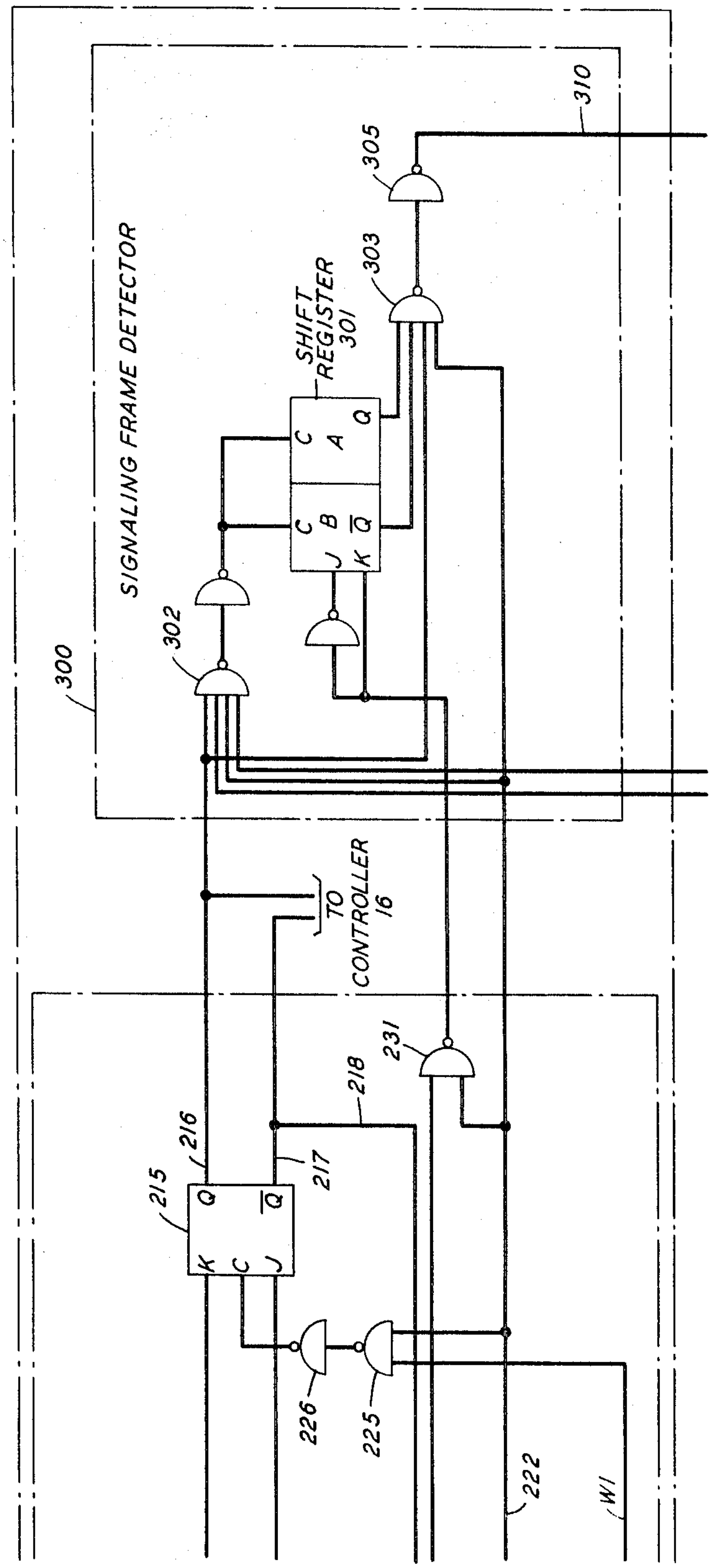

The incoming pulse train on trunk 12(1) first passes through receiving converter and clock regenerator 200, FIG. 2 which forms a part of trunk unit 20(1). Circuit 200 converts the incoming pulse train from bipolar to unipolar form for processing in the tandem office and also regenerates clock pulses from the incoming path. The 24 channels of information in the converted pulse train then are transmitted to store 70(1) where the word in channel 10 is registered in channel unit 700(10) under control of frame detector 201, FIGS. 2 and 3, or in signaling inserter 710(10) under control of signaling frame detector 300, FIG. 3. Timing of the signal registration is under control of demultiplexer 60(1) which in turn is regulated by framing pulses derived from the incoming pulse train by frame detector 201.

Initially it is assumed that channel 10 contains a request for service which, in this instance, will be reflected by a "0" in the eighth bit position of channel 10 in the sixth or signaling frame. Thus, during the signaling frame a "0" will be registered in signaling inserter 710(10).

Trunk scan unit 150(1) which serves trunk 12(1) will compare the eighth bit of each channel in sequence with the corresponding dump status indication provided by store 70(1), which simply indicates the busy or idle status of a particular channel in the previous frame. Thus in channel 10, the "0" in the eighth bit position is compared with the dump status indication which, in this instance, indicates that channel 10 was idle in the previous frame. Truck scan unit 50(1) will halt its scan temporarily and alert verify service request circuit 160(1) which then observes the signaling bit in channel 10 for three consecutive signaling frames. If the service request is observed on each occasion, it will be confirmed by the transmission of a go-busy signal to automatic on-hook circuit 170(1). The go-busy signal is then transmitted on command to the office scan unit 100 which in turn, transmits the address of trunk 12(1) and channel 10 to processor 15 via controller 16.

Thereafter, processor 15, acting through controller 16, reads out the information contained in channel 10 in subsequent frames. Advantageously, register facilities available in space division system 10 are utilized at this point to store the designation of the called line. This designation is retrieved from channel unit 700(10) by dump memory 90(1) in an assigned time channel on trunk 21(*a*), through which it is transferred to codec 13. The called line designation then is decoded and applied to space division switching system 10 through an incoming truck circuit 17. The space division system is directed by processor 15 to establish a temporary connection from this incoming trunk circuit to a pulsing receiver which, in turn, retains the pulses from the source office until requested by processor 15. The outgoing trunk 21(*n*), to be used in reaching the called line, now is selected by interrogation of busy-idle status memories, such as 140(1), in cooperation with processor 15.

All of the information essential to the establishment of a call connection through the time division switching network now is available in processor 15, viz., the incoming trunk designation, 12(1), the outgoing trunk designation, 21(*n*), the designation of incoming channel 10 and, by interrogation of the appropriate busy-idle status memory, the designation of idle channel 20 in outgoing trunk 21(*n*). The new trunk and channel designations are transferred through controller 16 to the various memory units such that, on each appearance of incoming channel 10 in subsequent frames, the called line designation is transferred serially, a bit per frame from the pulsing receiver, in space division system 10 to channel unit 700(10), and on each appearance of channel 20, the same information is retrieved from channel unit 700(10) and transmitted over trunk 21(*n*). The transfer operation, under control of processor 15, follows a path through codec 14(1) and OR gate 255 in incoming trunk unit 20(1), FIG. 6.

The transmitting function requires, of course, that the proper framing information be reinserted in the outgoing pulse train such that the next office in the transmitting chain will receive the identical information at the proper time. For this purpose the office clock circuit 40 controls the timing of the outgoing pulse train. Thus digit pulses D1—D8 and word pulses W1—W24 are generated by digit and word pulse generator 405 contained in clock circuit 40. This clock circuit also provides the binary address of each currently active time channel for use by dump memory 90(1). As indicated heretofore, framing code generator 410 develops the appropriate framing pattern which is then inserted in multiplex fashion in the outgoing path of the selected trunk **21(*n*) through the corresponding outgoing trunk unit 50(*n*). Upon completion of the call connection, information received in channel 10 of incoming trunk 12(1) again will be inserted in channel unit 700(10)**.

When the calling party disconnects, the next appearance of channel 10 during the signaling frame will provide a "1" in the eighth bit position. When this new service request indication is verified by circuit 16(1), the corresponding trunk scan unit 150(1) will provide a go-idle indication to automatic on-hook circuit 170(1). No specific record is maintained for the assigned outgoing channel 20. Therefore, in order to locate this channel and make it idle, the on-hook indication triggers a comparison in comparator 1715 of the channel address contained in register 650 of demultiplexer 60 with each address from dump memory 90 in sequence. A match indicates the particular time channel, in this instance channel 20, which is to be made idle. When this comparison is completed, the incoming channel address 10 is gated from register 650 to controller 16 to clear channel 10. Also dump memory 90(1) receives a make-idle signal from the comparison conducted in on-hook circuit 170(1) as do all other memory units which stored the outgoing channel designation. Thus the comparison output signal serves to clear time channel 20 as well as demultiplexer 60 and automatic on-hook circuit 170(1). Channels 10 and 20 in respective trunks 12(1) and **21(*n*)** are now free to carry another call.

Consider now that space division system 10 recognizes that an incoming call on an analog trunk 11 requires the assignment of an outgoing digital trunk to reach the desired destination. It first notifies processor 15 that assignment of an outgoing digital trunk is required. Processor 15 determines from its records which of the incoming digital trunks contain idle channels, and upon selection of an idle channel, a busy signal is transmitted to the office originating the selected incoming digital trunk via the corresponding outgoing digital trunk. The busy signal serves, in this instance, to prevent the originating office from assigning the channel selected by processor 15. Upon receipt of a verification signal in the selected channel, processor 15 enables space division switching system 10 to connect the incoming analog trunk to codec 14(1) associated with the selected digital trunk, in this instance, trunk 12(1). Codec 14(1) is designed, as noted hereinbefore, to convert incoming analog signals to digital form and vice versa. Thus codec 14(1) can transfer up to 24 conversations simultaneously in either direction. Timing of the transfer from codec 14(1) to the corresponding incoming trunk unit 20(1) is under control of demultiplexer 60(1) which regenerates the incoming digital trunk timing. Also transfer of the analog signals to particular channel registers in codec 14(1) is under control of processor 15. Consider, for example, that processor 15 has now verified that channel 3 of incoming digital trunk 12(1) is idle. Processor 15 now alerts system 10 to the fact that the incoming call may be connected to codec 14(1) and also enables codec 14(1) to steer the incoming analog signals to a register corresponding to channel 3. The channel word pulses W1—W24 from demultiplexer 60(1) enable the outputs of the respective channel registers such that digital information will now be received through OR gate 255, FIG. 2, from codec 14(1) in channel 3 as determined by the W3 pulse from demultiplexer 60(1). Subsequent processing corresponds to that already described for connections to outgoing digital trunks. Upon completion of the call, processor 15 notifies the office originating incoming digital trunk 12(1) of its availability to transmit calls on channel 3.

For calls from incoming digital trunks to outgoing analog trunks, processor 15 again controls the routing through an available codec, this time determining in advance, by interrogation of system 10, that an idle outgoing analog trunk is available.

It is understood that the above-described arrangements are illustrative of the application of the principles of the invention. Numerous other arrangements may be devised by those skilled in the art without departing from the spirit and scope of the invention.

What we claim is:

1. In a tandem switching office, a plurality of digital incoming trunks and a plurality of digital outgoing trunks, a plurality of analog incoming trunks and a plurality of analog outgoing trunks, time division switching means for interconnecting individual channels of said digital incoming and outgoing trunks, store means including channel units for each channel of said digital incoming trunks, means for connecting said channel units to said time division switching means, means for storing digital information from each channel of a digital incoming trunk in its respective store means channel unit, space division switching means for interconnecting said analog incoming and outgoing trunks, and means for connecting said analog incoming trunks through said space and time division switching means to channels of said digital outgoing trunks comprising means for converting analog information on said analog incoming trunks to the digital form encountered on said digital incoming trunks and means for connecting said information converting means between said space division switching means and available ones of said store means channel units.

2. In a tandem switching office, the combination of claim 1 further comprising means for deriving first timing information from said digital incoming channels for controlling the storing of information in said store means channel units and independent timing means in the tandem switching office for deriving second timing information for controlling the transfer of said digital information through said time division switching means to said digital outgoing trunk channels.

3. In a tandem switching office, the combination of claim 1 wherein said information converting means includes means comprising a plurality of code conversion channels and wherein said means for connecting said information converting means comprises means for connecting one of said code conversion channels to a selected one of said store means channel units in place of a digital incoming trunk channel.

4. In a tandem switching office, the combination of claim 1 further comprising second information converting means connected in place of an outgoing digital trunk on said time division switching means and in place of an incoming analog trunk on said space division switching means.

5. A tandem office comprising a time division system for switching digital signals contained in repetitive time channels multiplexed in a serial pulse train on an incoming trunk to outgoing trunks, said system comprising means for generating pulses corresponding to the clock rate of the office originating the incoming pulse train, means controlled by said generating means for defining a plurality of channel and digit intervals in repetitive frames, a store containing a plurality of channel units, means operative in response to outputs from said generating means and from said defining means for storing the content of each channel in a frame of the incoming pulse train in a distinct one of said channel units, a tandem office clock, means enabled by pulses from said clock for extracting said words from said storing means in a revised sequence to form an outgoing pulse train, means for detecting framing signals in the incoming pulse train, means connected to said framing signal detecting means for recording a change in the type of framing signal provided by the incoming pulse train, means operative in response to an output from said recording means for retrieving a supervisory indication from the incoming pulse train and means for inserting said supervisory indication in said outgoing pulse train.

6. A system for switching time division multiplex signals between incoming and outgoing trunks comprising first and second means for generating pulses which define channel and bit intervals in repetitive frames, a store comprising a plurality of channel storage units, means utilizing signals in the pulse train on an incoming trunk for enabling said first generating means to direct the content of each channel in a frame of said incoming pulse train to corresponding ones of said channel storage units, local clock means for enabling said second generating means and control means enabled by said second generating means to retrieve the content of said channel storage units and to switch the resultant pulse stream to corresponding channels in predetermined outgoing trunks.

7. A system in accordance with claim 6 wherein said control means comprises a dump memory containing the status of each channel during the previous frame on said outgoing trunk and means connected between said dump memory and said channel storage units for enabling the output of said channel storage units in accordance with the storage sequence in said dump memory.

8. A system in accordance with claim 7 and further comprising means for detecting requests for service including a trunk scan unit for comparing service request information received on said incoming trunk with the status of the corresponding channel produced by said dump memory and received through said channel storage units and means operative in response to receipt of the output of said trunk scan unit for registering the address of said channel requesting service.

9. A system in accordance with claim 8 wherein said detecting means further comprises a verify service request circuit for comparing the address of said service requesting channel stored in said channel address registering means with each output of said first generating means during a plurality of consecutive frames and means for registering each occurrence of the service request concurrent with receipt of an output from said verify service request circuit.

10. A system in accordance with claim 9 further comprising a signal processor and wherein said detecting means further comprises means for scanning said service request registering means to determine channels indicating a verified request to originate service, trunk address registering means and means responsive to receipt of a verified service request from said service request registering means for enabling the transmission from said channel and trunk address registering means of the corresponding channel and trunk addresses to said signal processor.

11. A system in accordance with claim 10 wherein said detecting means further comprises an automatic on-hook circuit responsive to a verified request to discontinue service from said service request registering means for comparing the output of said channel address registering means with each output of said dump memory and means responsive to an output of said automatic on-hook circuit for removing the compared channel address from said dump memory and from each of said registering means.

12. A system in accordance with claim 6 further comprising space division switching means for switching analog signals on incoming analog trunks to outgoing analog trunks and means for switching incoming analog signals to outgoing digital trunks including means for converting analog signals to the digital form encountered on the digital trunks and means for connecting said converting means between said space division switching means and available ones of said channel storage units.

13. A system in accordance with claim 12 further comprising means for switching incoming digital signals to outgoing analog trunks including means for converting digital signals to the analog form encountered on the analog trunks and means for connecting said last-mentioned converting means in place of an outgoing digital trunk and in place of an incoming analog trunk.